United States Patent
Ren

(10) Patent No.: US 11,106,629 B2
(45) Date of Patent: Aug. 31, 2021

(54) METHOD AND SYSTEM FOR A DISTRIBUTING COMPUTING PLATFORM

(71) Applicant: Futurewei Technologies, Inc., Plano, TX (US)

(72) Inventor: Da Qi Ren, Saratoga, CA (US)

(73) Assignee: Futurewei Technologies, Inc., Plano, TX (US)

(*) Notice: Subject to any disclaimer, the term of this patent is extended or adjusted under 35 U.S.C. 154(b) by 404 days.

(21) Appl. No.: 16/023,654

(22) Filed: Jun. 29, 2018

(65) Prior Publication Data

US 2019/0354605 A1 Nov. 21, 2019

Related U.S. Application Data

(60) Provisional application No. 62/673,331, filed on May 18, 2018.

(51) Int. Cl.
*G06F 16/00* (2019.01)
*G06F 16/14* (2019.01)
*G06F 16/182* (2019.01)

(52) U.S. Cl.
CPC .......... *G06F 16/148* (2019.01); *G06F 16/182* (2019.01)

(58) Field of Classification Search
CPC ..... G06F 16/148; G06F 16/182; G06F 9/5083
See application file for complete search history.

(56) References Cited

U.S. PATENT DOCUMENTS

| | | | | |
|---|---|---|---|---|
| 5,873,093 A | * | 2/1999 | Williamson | G06F 16/2438 |
| 5,974,238 A | * | 10/1999 | Chase, Jr. | G06F 12/0815 |
| | | | | 707/999.2 |
| 6,038,565 A | * | 3/2000 | Nock | G06F 16/289 |
| 7,376,658 B1 | * | 5/2008 | Bumgarner | G06F 16/27 |
| | | | | 707/736 |
| 10,552,443 B1 | * | 2/2020 | Wu | G06F 16/258 |
| 2011/0252420 A1 | * | 10/2011 | Tung | G06F 9/45533 |
| | | | | 718/1 |
| 2016/0321308 A1 | * | 11/2016 | Brinnand | G06F 16/951 |
| 2018/0107725 A1 | * | 4/2018 | Bi | G06F 3/06 |

* cited by examiner

*Primary Examiner* — Tyler J Torgrimson
(74) *Attorney, Agent, or Firm* — Vierra Magen Marcus LLP

(57) ABSTRACT

A method and system for a distributing and computing platform are provided that generates a mapping between each of a plurality of applications and a plurality of application storage formats, wherein each application has a mapping to at least one application storage format; stores the mapping of the application and the application storage format in the name node; obtains a data node storage format information for each of the plurality of data nodes; stores the data node storage format information for each of the plurality of data nodes in the name node; and stores data generated by at least one of the plurality of applications in at least one data node based on the mapping information stored in the name node. Through the above embodiment, the distributing and computing platform may store the data in the data node with the storage format which is proper for the application.

19 Claims, 17 Drawing Sheets

| Concluding File Access Patterns | | Type and Pattern of File Access | Format System Selection Priority of File System (fair ——— best fit) | | | |
|---|---|---|---|---|---|---|
| Workload Algorithm | o Stress points<br>o I/O utilization<br>o Operations type (query, join, etc)<br>o Recursive iterations<br>o CPU usage and bound<br>o Cluster architecture | seq. char in<br>seq. char out<br>seq. block in<br>seq. block out<br>seq. block direct in<br>seq. block direct out | EXT4<br>XFS<br>EXT4<br>EXT4<br>EXT4<br>EXT4 | EXT3<br>EXT4<br>XFS<br>XFS<br>EXT3<br>XFS | XFS<br>EXT3<br>EXT3<br>BTRFS<br>EXT3<br>BTRFS | BTRFS<br>BTRFS<br>BTRFS<br>EXT3<br>BTRFS<br>EXT3 |
| Platform | o Average I/O data size of a map task<br>o Ratio of a map output to a map input<br>o Total number of map/reduce tasks/slots<br>o Average execution time of a map/reduce task<br>o Number and size of shuffle tasks in each wave | random seeks<br>file create<br>file remove<br>seq. read<br>seq. write | EXT3<br>EXT4<br>EXT4<br>XFS<br>EXT4 | XFS<br>XFS<br>XFS<br>EXT4<br>XFS | EXT4<br>EXT4<br>EXT4<br>EXT4<br>BTRFS | BTRFS<br>BTRFS<br>BTRFS<br>EXT3<br>EXT3 |
| System level | o Type of FS system (HDFS etc)<br>o I/O access pattern<br>o File compressions<br>o CPU Hyper threading | random read<br>random write<br>prep.100K r PSQL<br>rd.100K r PSQL<br>complex R/W/trans<br>Linux untar<br>Linux tar | XFS<br>EXT3<br>BTRFS<br>EXT3<br>EXT3<br>XFS<br>XFS | BTRFS<br>XFS<br>EXT4<br>XFS<br>XFS<br>BTRFS<br>EXT3 | EXT4<br>EXT4<br>EXT4<br>EXT4<br>EXT4<br>EXT4<br>EXT4 | EXT3<br>BTRFS<br>XFS<br>BTRFS<br>BTRFS<br>EXT3<br>BTRFS |
| Hardware | o Memory Size (GB)<br>o Storage Size(GB)<br>o I/O performance<br>o Storage Format | seq. wt. fragment<br>rand wt. fragment | EXT4<br>EXT4 | XFS<br>XFS | EXT3<br>EXT3 | BTRFS<br>BTRFS |

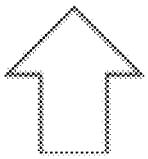

Figure 8

METHOD AND SYSTEM FOR A DISTRIBUTING COMPUTING PLATFORM

CROSS-REFERENCE TO RELATED APPLICATIONS

The present application claims priority to U.S. Provisional Patent Application No. 62/673,331, filed May 18, 2018, entitled "a method and a distributing and computing platform", which application is hereby incorporated herein by reference.

FIELD OF THE INVENTION

The present disclosure is related to a distributed file system, and in particular to a method and a distributing and computing platform.

BACKGROUND

A distributed computing platform, such as Hadoop or other MapReduce-related frameworks, includes software which allocates computing tasks across a group, or "cluster," of distributed software components executed by a plurality of computing devices, enabling large workloads (e.g., data sets) to be processed in parallel and more quickly than is generally feasible with a single software instance or a single device. Such distributed computing platform typically utilizes a distributed file system that supports input/output-intensive distributed software components running on a large quantity (e.g., on the order of thousands) of computing devices to access a large quantity (e.g., petabytes) of data. For example, a data set to be analyzed by Hadoop may be stored within a Hadoop Distributed File System (HDFS) that is typically used in conjunction with Hadoop, which enables various computing devices running Hadoop software to simultaneously process different portions of the file.

Big data is on an unprecedented scale and pace in modern industry. A MapReduce paradigm and Hadoop based processing platform is a current fundamental architecture for executing analytical workloads on the big data. The ability to perform a timely and cost-effective analytical processing of such large datasets has become a key ingredient for success.

The performance results of benchmarking a big data System Under Test (SUT) are not only depend on the hardware and software platform themselves, but also depend on the knowledge of the workload characters; the system configuration; file system and etc.

SUMMARY

One embodiment of the disclosure includes a method performed by a distributing and computing platform comprising a plurality of data nodes and a name node, with the name node communicating and managing each of the plurality of data nodes. In the method, the distributing and computing platform generates a mapping between each of a plurality of applications and a plurality of application storage formats, wherein each application has a mapping to at least one application storage format. The distributing and computing platform stores the mapping of the application and the application storage format in the name node, obtains a data node storage format information for each of the plurality of data nodes. The data storage format information identify the file system of the data node. The distributing and computing platform further stores the data node storage format information for each of the plurality of data nodes in the name node, and stores data generated by the at least one of the plurality of applications in at least one data node based on the mapping stored in the name node Through the above embodiment, the distributing and computing platform may store the data generated by the at least one of the plurality of the applications in the data node with the storage format which is proper for the application generating the data to improve processing efficiency of the data. The improvement in processing efficiency includes a more efficient use of resources and reduced processing time.

A second embodiment of the disclosure includes name node wherein the name node comprises a non-transitory memory comprising instructions, and one or more processors in communications with the memory. The one or more processors are configured to execute the instructions to: obtain a mapping between each of a plurality of applications and a plurality of application storage formats, wherein each application has a mapping to at least one application storage format; store the mapping of the application and the application storage format; obtain a data node storage format information for each of a plurality of data nodes; store the data node storage format information for each of the plurality of data nodes; and, instruct the plurality of applications to store data in at least one data node based on the mapping information. Through the above embodiments, the distributing and computing platform may store the data in the data node with the storage format which is proper for the application generating the data which improves processing efficiency.

BRIEF DESCRIPTION OF THE DRAWINGS

FIG. 8 illustrates an example of a mapping between data access patterns of the application and the application storage format information, according to one embodiment of the present disclosure.

DETAILED DESCRIPTION

In the following description, reference is made to the accompanying drawings that form a part here of, and in which is shown by way of illustration, specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

A MapReduce paradigm and Hadoop based distributing & computing platform is the current fundamental architecture for executing the analytical workloads on the big data. Industry benchmarks provide methods of comparing the performance of various big data platforms from many hardware and software venders' systems across different architectures. The benchmarks for big data analytics are a set of programs or operations by running a number of standard tests to assess the relative performance of the system with respect to processor and memory performance, disk operations and network I/O. On the software side, there are benchmarks for the performance of the software stacks such as Spark, Hive, garbage collection, user threads and some aspects of an operating system. Studies of benchmarks results are performed to improve scalability of building distributed applications for the service, and achieve the best usage of the system resource.

There are different solutions provided for the big data analytics. Several of systems have been studied, the systems includes enterprise storage systems, web servers, clusters and network systems. Workloads have also been studied at different levels. Some studies have provided with multiple metrics about the data access pattern in MapReduce scenarios, but these metrics are limited, such as block age at time of access and file popularity.

Figure 1A:
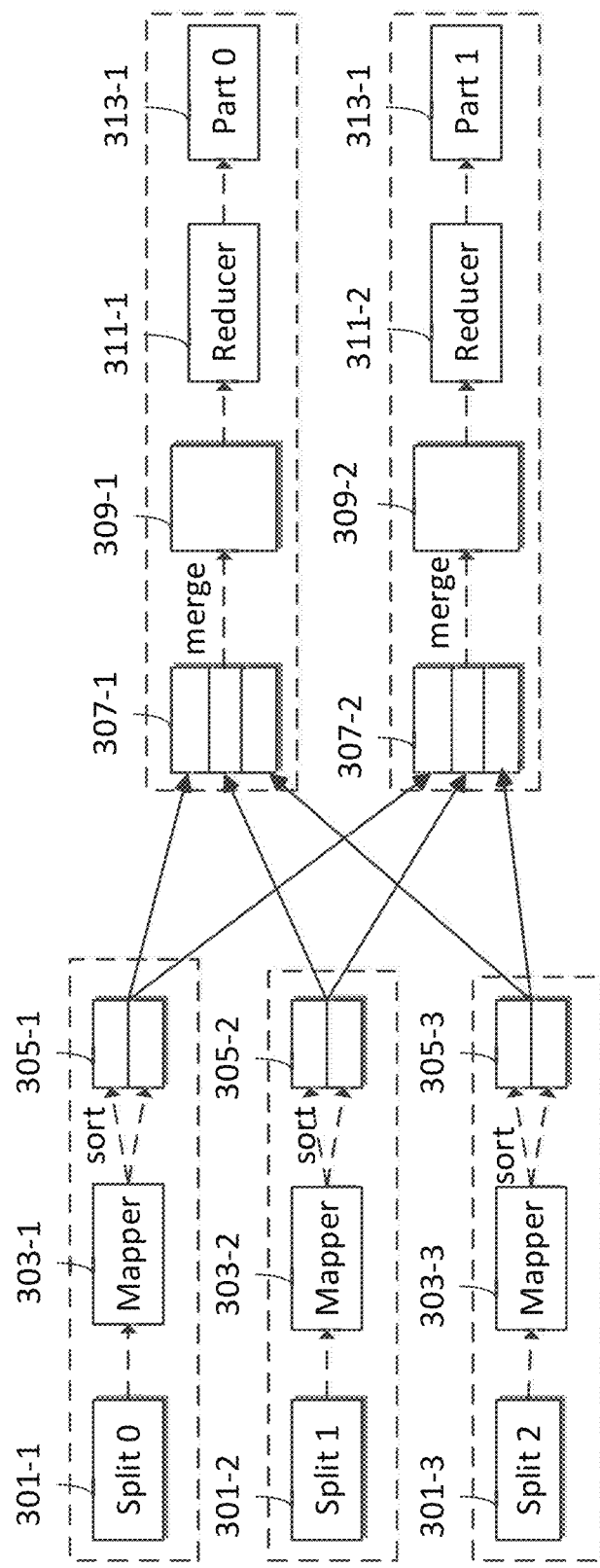
FIG. 1A illustrates an example of a generic MapReduce Hadoop workflow in the distributed file platform that may be used for implementing the devices and methods disclosed herein, according to one embodiment of the present disclosure.

FIG. 1A illustrates an example of a generic MapReduce Hadoop workflow in the distributed & computing system, which may be a Hadoop Distributed File System (HDFS) in one embodiment that may be used for implementing the devices and methods disclosed herein, according to one embodiment of the present disclosure. The MapReduce Hadoop workflow includes, for example, input data being split 301-1, 201-2, 303-3, sent to a mapper 303-1, 303-2, 303-3 for mapping, and the sorted at 305-1, 305-2, 305-3. The sorted data is then shuffled at 307-1, 307-2 and merged at 309-1, 309-2, then reduced by reducer at 311-1, 311-2 to produce an output part 0 313-0 and part 1 313-2.

Figure 1B:
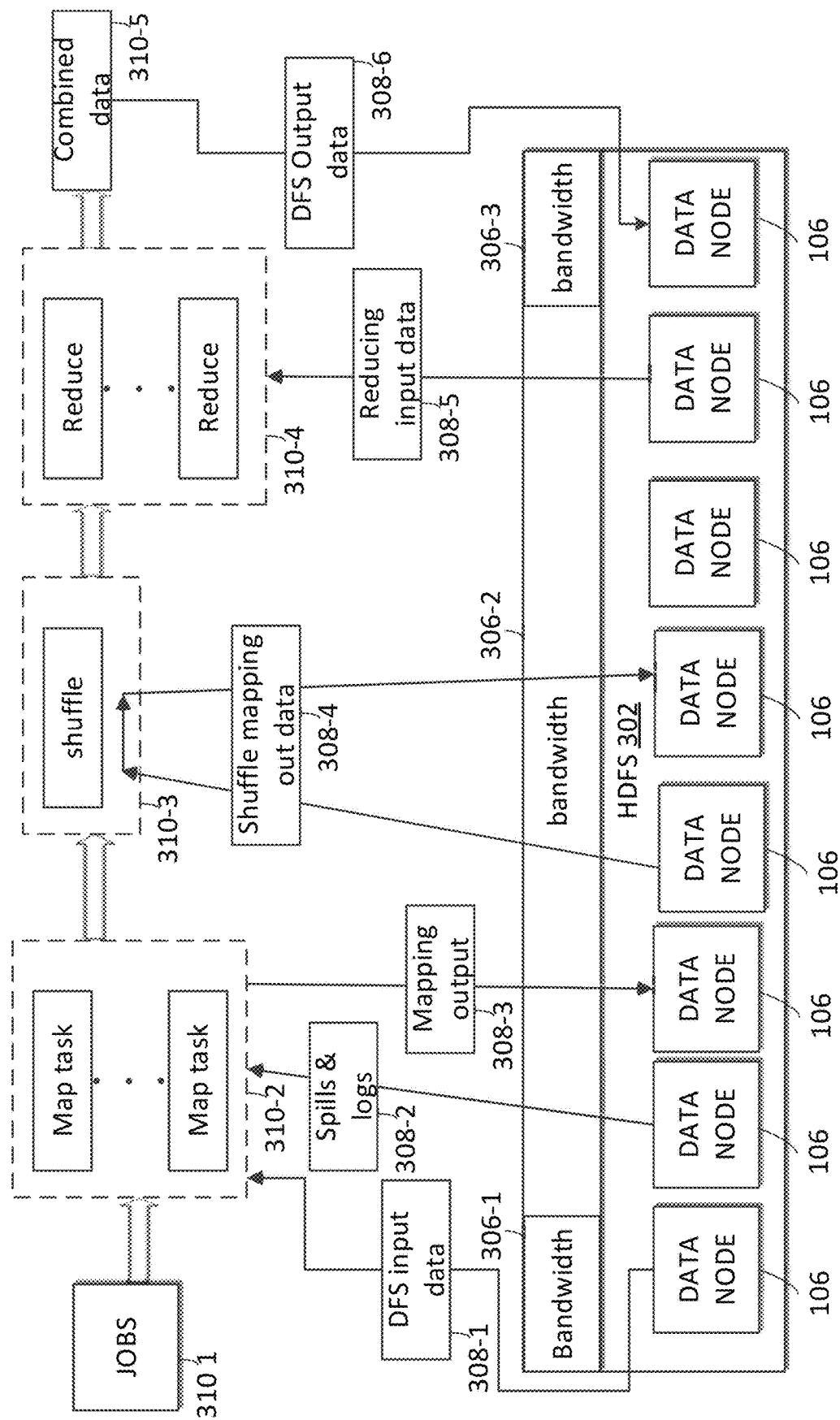
FIG. 1B illustrates an example of a bandwidth rate taken by different part of the generic MapReduce Hadoop workflow, according to one embodiment of the present disclosure.

FIG. 1B illustrates an example of a bandwidth rate taken by different part of a generic MapReduce Hadoop workflow, according to one embodiment of the present disclosure. Referring to FIG. 1B, the Hadoop job flow involves flushing data within the disk of the data nodes or the HDFS. This data flushing requires a lot of disk I/O overhead which can reduce performance of a job. Referring to FIG. 1B, different parts of the generic MapReduce Hadoop workflow takes up different rate of bandwidth 306-1, 306-2, 306-3 such as reading the DFS input data 308-1 from the data node 108 to the mapper to form map task 310-2 takes about 12 of bandwidth. As an example, the data flushed onto a disk of a data node as a DFS output data 308-6 after being combined 310-5 can take up a bandwidth of about 12% of the total bandwidth. The other analyzing, computing or processing work of the Hadoop job 310-1, such as spills & logs 308-2, map out 308-3, shuffle mapping out data 308-4 via shuffle 310-3, reducing input data 308-5 via reduce 310-4 take about 75% of the bandwidth.

The data stored in the data nodes 106 of the distributing & processing platform 100 may be used to be read, written and analyze, computed or processed for the future uses. But some data will be used for more reading and writing than analyzing, computing or processing based on a processing attribute of the data file, and other data file may be used for more analyzing, computing or processing than the reading and writing based on the different processing attribute of data file.

Figure 2A:
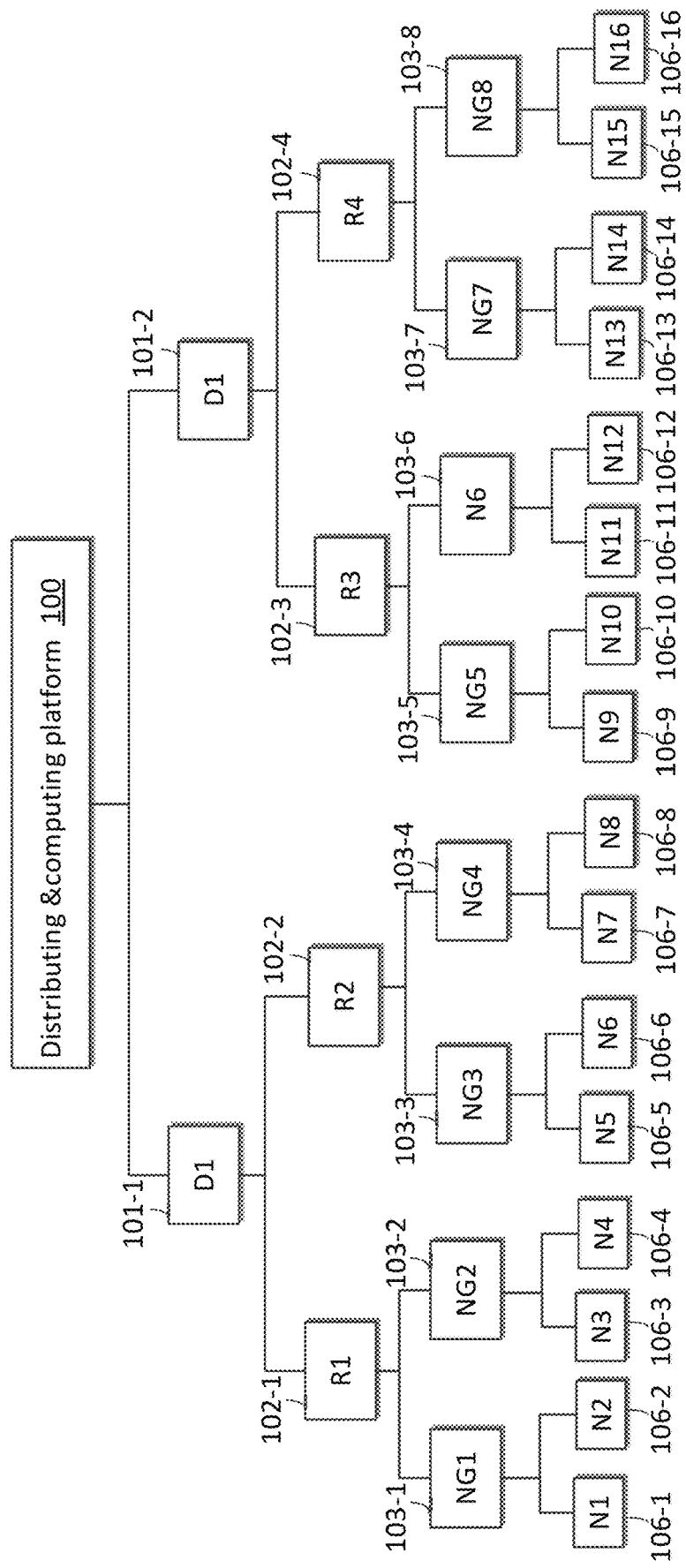
FIG. 2A is a block diagram of a distributing & computing platform according to an example embodiment.

FIG. 2a illustrates an example of a distributing & processing platform 100 that may be used for implementing the devices and methods disclosed herein. The distributing & processing platform 100 may be the HDFS, or other system. As illustrated in FIG. 2A, the distributing & processing platform 100 includes at least one data centers, such as data centers 101-1 and 101-2. Each data center includes one or more rack. For example, the data center 101-1 includes a rack 102-1 and a rack 102-2. Each rack may include one or more node groups. For example, the rack 102-1 may include a node groups 103-1, 103-2, 103-3, 103-4, 103-5, 103-6, 103-7, 103-8. Each node group may include one or more nodes (which may be a data node or a name node). For example, the node group may include a node 106-1, 106-2, 106-3, 106-4, 106-5, 106-6, 106-7, 106-8, 106-9, 106-10, 106-11, 106-12, 106-13, 106-14, 106-15, 106-16.

The data center, the node group, and the node are logical terms. The node group may be a group of nodes assigned to a user, may also be a group of nodes including same attribute, such as are formatted by a same file system and so one. The node group information may be stored in a name node of the distributing and computing platform. The node group information may also be obtained by the name node based on the node information.

Figure 2B:
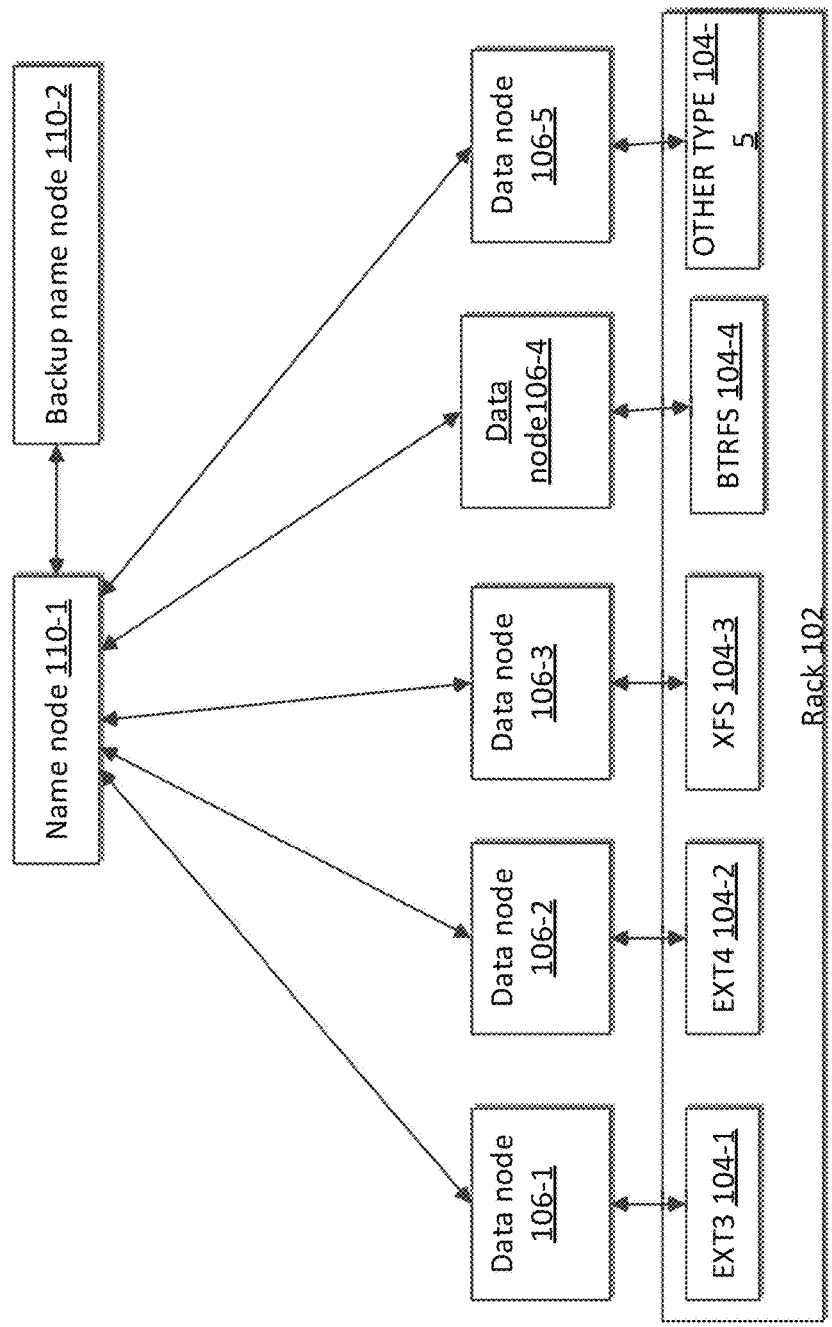
FIG. 2B is a block diagram of a distributing & computing platform according to an example embodiment.

FIG. 2B illustrates an example of a distributing & processing platform 100 that may be used for implementing the devices and methods disclosed herein. The distributing & processing platform 100 may be the HDFS, or other system. As illustrated, the distributing & processing platform 100 includes at least one rack 102 (only one rack is shown in FIG. 2B). The rack 102 includes a plurality of disks, different file systems 104 are formatted to the plurality of disks. The plurality of data nodes 106 (from 106-1 to 106-5) and the name node 110-1 and 110-2 are logic nodes of the distributing & computing platform 110, each of the plurality of data nodes 106 may comprise one or more disks which are formatted by different file systems including an EXT3 104-1, an EXT4 104-2, an XFS 104-3, an BTRFS 104-4, and other type of file system 104-5. The name node 110-1 and back up name node 110-2 may also include one or more disks.

The disks of the rack 102 are formatted different type of file system 104 including an EXT3 104-1, an EXT4 104-2, a XFS 104-3, a BTRFS 104-4, and other type of file system. The name node 110-1 may communicate with each of the plurality of data nodes 106, and may communicate with the backup name node 110-2.

In some examples, the distributing & computing platform 100 may include one or more racks 102, each of the one or more racks includes a plurality of disks formatted different type of file systems (such as files systems 104-1 to 104-5). The name node 110-1 and back up name node 110-2 may locate at any of one or more racks 102 of the computing & distributing platform 100.

The name node 110-1 of the distributing & computing platform 100 is configured to store and access data files in a distributed manner across the plurality of data nodes 106 (e.g., 106-1, 106-2 . . . 106-5). A data file stored in the distributing & computing platform 100 is split into one or more data blocks to be stored in a set of data nodes 108. The name node 110-1 stores data node storage format information corresponding to the file system of each data node 108, stores a mapping between each of a plurality of applications run in the distributing and computing platform and a plurality of application storage formats, wherein each application has a mapping to at least one application storage format. The file system identifies the data node storage format of the data node running the application. The name node 110-1 also instructs the data nodes 108 to store blocks based on the mapping stored in the name node 110-1 and the storage node format information for each of the plurality of data nodes 108 in the name node 110-1.

The backup name node 110-2 is a back node of the name node 110-1, and also stores the file system type information, and the mapping of blocks for each data node 108. When the name node 110-1 has a problem, the backup name node 110-2 works as the name node 110-1, and is connected to each of the data nodes 108.

Each data node 108 is configured to serve to read and write requests from a user device, stores the data from the user device. The data nodes 108 may be further configured to perform a block creation, deletion, and replication, after receiving an instruction from. Each data node 312 uses and manages a local data store to store data blocks.

Each data node 108 may comprises one or more disks, with each of the one or more disks are formatted using a file system 104. Each of the data nodes 108 report the data node storage format information in the name node 110-1. The data node storage format information of the data node 108 corresponds to the file system 104 formatted on the data node 108. Further, each data node 108 includes an operating system which meets the requirement of the file system formatted in the data node 108. For example, a Btree file system has Linux supported operating system whereas the fourth extendable file system (Ext4) has Linux operating system.

Figure 3A:
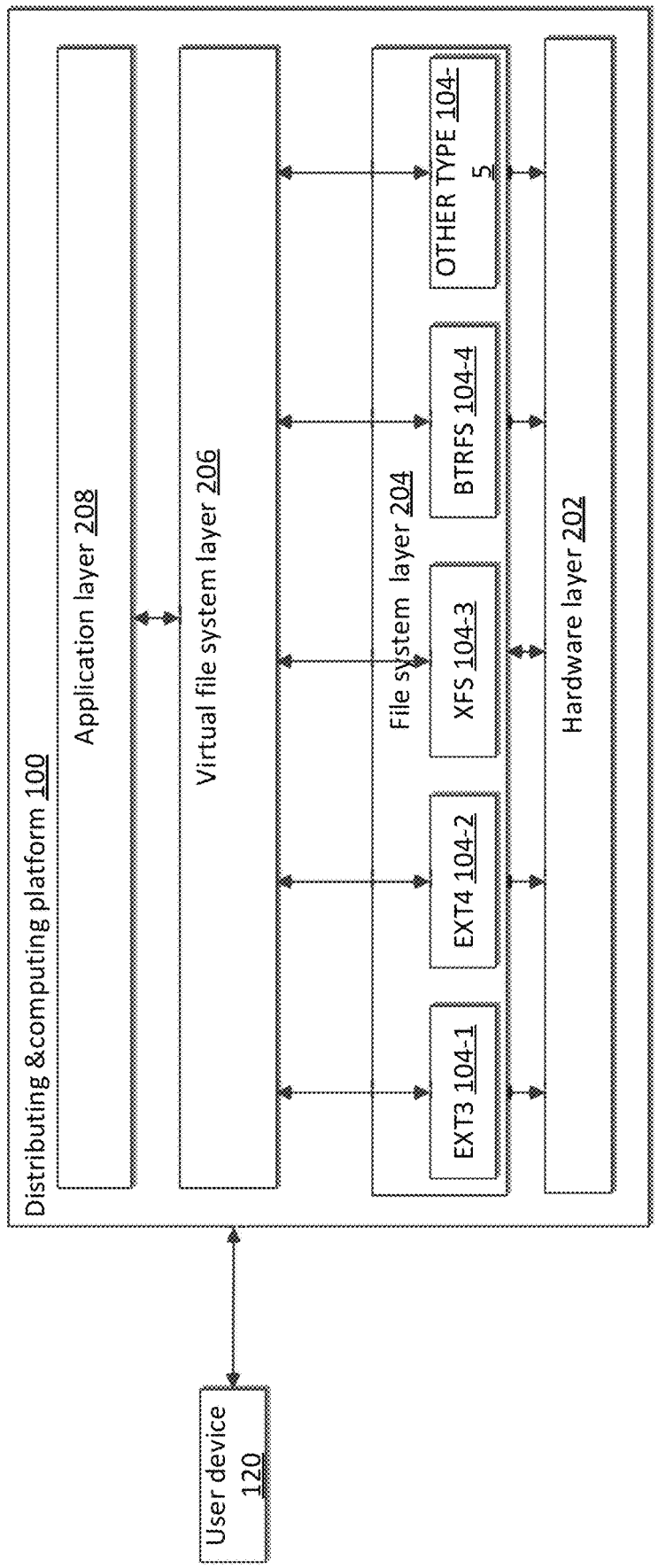
FIG. 3A illustrates an example of a distributing & computing system 200, according to one embodiment of the present disclosure.

FIG. 3A illustrates an example of a distributing & computing system 200, according to one embodiment of the present disclosure. As illustrated, distributing & computing system 200 includes a distributing & computing platform 100 and a user device 120. The distributing & processing platform 100 includes a hardware layer 202, a file system layer 204, a virtual file system layer 206 and an application layer 208. The file system layer 204 is coupled to the hardware layer 202, the virtual file system layer 206 is coupled to the file system layer 204, and the application layer 208 is coupled to the virtual file system layer 206.

The hardware layer 202 comprises one or more racks 102, each of one or more racks 102 includes a plurality of disks. Each disk is formatted a file system 204 in the file system layer 204. The file systems 204 in the file system layer 204 include an EXT3 104-1, an EXT4 104-2, a XFS 104-3, a BTRFS 104-4, and so on. The one or more disks is consisted to different logic entity, such as the plurality of data nodes 106, the name node 110-1, the backup name node 110-2, and other kind of logic module.

The virtual file system 206, such as the Hadoop application, runs on the top of the file systems 204 to manage all nodes including the plurality of data nodes 108 and the name nodes 110 of the distributing & computing platform 100, and to enable to share the resources of the hardware layer 202. The virtual file system 206 may run on the top of an operating system of the data nodes or directly on the hardware layer.

The virtual file system layer 206 comprises a virtual file system which may be a Hadoop application and be configured to process a large set of data using a set of data nodes 108 (e.g., data nodes 108-1 to 108-5) allocated to the distributing & computing platform 100. It should be recognized that alternative architectures, such as a YARN (Yet Another Resource Negotiator) and other MapReduce-related architectures, may be utilized with the techniques described herein. It should be further recognized that, while embodiments of present disclosure are described in terms of a Hadoop installation, other distributed computing applications may be configured and utilized according to the techniques provided herein.

The application layer 208, which runs on the top of the virtual file system layer 206, may include one or more guest applications.

In the embodiment depicted in FIGS. 2A, 2B and 3A, each data node 106 includes a guest operating system (OS) (e.g., Microsoft Windows, Linux). The one or more guest applications running on top of guest OS. In one embodiment, each data node 108 includes a runtime environment, such as a Java Virtual Machine (JVM), that supports execution of a distributed software component code (e.g., Java code) for the virtual file system 206. In some embodiments, distributed software component code may implement functionality of "data nodes", for storing data distributed across the distributing & computing platform 100.

In some embodiments, the distributing and computing platform includes the plurality of data nodes 108, the name node 110-1, the backup name node 110-2 and other logic module which are not shown in the Figures, and includes a guest OS, a runtime environment, and distributed software component code.

The file systems (104-1 . . . 104-5) manage the disks and enable the disks to store, access, and administrate files. Both the Ext4 206-2 and the BTRFS 206-4 are file systems used in Linux operating systems, and are very popular to be used.

The Ext4 file system 104-2 is the fourth extended file system. The Ext4 file system 104-2 uses extents, i.e. a contiguous group of blocks, makes allocation storage much more efficient. The Ext4 file system 104-2 also decreases a fragmentation, and allows for much larger files and volumes than previous version EXT file systems, such as Ext3 file system 104-1. The maximal file size in the Ext4 file system 104-2 is 16 TB, whereas the maximum volume size in the Ext4 file system 104-2 is even set to 1 EB (that is 1024× 1024×1 TB). The Ext4 file system 104-2 is accomplished with some pre-allocation features, i.e. data blocks can be reserved, even if the data blocks are not used immediately. In addition, the Ext4 file system 104-2 has delayed allocation feature that allows the actual writing of files being delayed until the last possible moment, which simultaneously increases the performance and decreases the fragmentation. All above support faster file system checks. This becomes more beneficial as the file system grows in size. Other allocation schemes that the Ext4 file system 104-2 has including: a Multi-block allocation; a Stripe-aware allocation. Because of delayed allocation and other performance optimizations, the Ext4's behavior of writing files to disk is different from previous file systems. In the Ext4 file system 104-2, a program's writes to the file system are not guaranteed to be on-disk unless the program issues an fsync( ) call afterwards.

The BTRFS file system 104-4 is a Btree file system. The BTRFS file system 104-4 is an open source file system that has been extensive development. The BTRFS file system 104-4 doesn't continually rely on the extended file system technology. It is expected to offer better scalability and reliability. The BTRFS file system 104-4 is a copy-on-write file system intended to address various weaknesses in current Linux file systems. Primary focus points include fault tolerance, repair, and easy administration. The main features are: Shrink and grow storage volumes; Copy-on-Write; extensive checksums maintained for all metadata and data; efficient writeable snapshots, clones as first class citizens; multi-device support; online resize and defragmentation; space-efficient packing of small files and many more useful improvements ensure data integrity. The BTRFS file system 104-4 may support up to a 16 Exbi-byte maximum file size that is about sixteen times of the data of the Ext4 file system 104-2 whose maximum file size can support is 16 Tebibyte. This improvement is very important as Linux is increasingly used within various enterprises and for storing much of the data we trust to the cloud. For pure data storage, The BTRFS file system 104-4 is claimed to be the winner over Ext4.

The BTRFS file system 104-4 has Linux supported operating system whereas Ext4 has Linux and FreeBSD. A data duplication is not allowed in Ext4, whereas in BTRFS file system 104-4 it is still in process.

The MapReduce efficiency on the file system Ext4 104-2 and the BTRFS file system 104-4, shows the difference between the two file systems in handling big data workload. An example is conducted an preliminary analysis for HDFS characterizations, including a file popularity, a temporal locality, request arrival patterns, and then figure out the data access pattern four types of standard big data benchmark workloads, i.e. TPC-HS, TPC-BB, TPC-H, HiBench, which are popular benchmarks in the current big data. In addition, the input/out behavior of both HDFS and MapReduce intermediate data from different I/O characteristics are also analyzed, including disk read/write bandwidth, I/O devices' utilization, average waiting time of I/O requests, and average size of I/O requests, different type of file system have different efficiency for the input/out behavior.

Figure 3B:
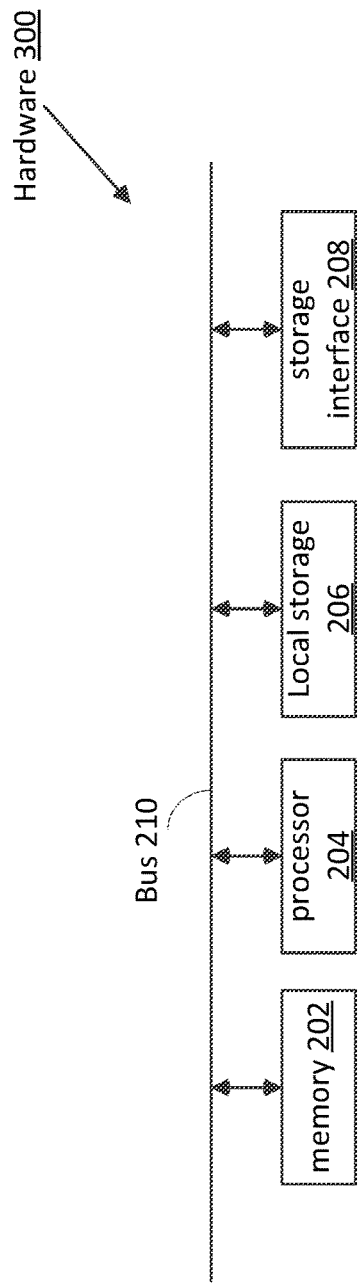
FIG. 3B illustrates an example of a hardware based logical entity, in the hardware layer, according to one embodiment of the present disclosure.

FIG. 3B illustrates an example of hardware of any logical entity, in the hardware layer, according to one embodiment of the present disclosure. The logical entity may be the plurality of data nodes 108, the name node 110-1, the backup name node 110-2 and other logic module which are not shown in the figures. The hardware may include a memory 202, a CPU 204, a local storage 206, a storage interface 208 and a bus 210. The bus 210 is connected to the memory 202, the CPU 204, the local storage 206, the storage interface 208.

In such an embodiment, each data node may store (and access) HDFS data blocks within the local storage 206) itself (e.g., where HDFS operates on top of the file system of guest OS and for example, stores HDFS data blocks as files within a folder of the file system of guest OS).

The memory is configured to store the software code component of the file system in the file system layer 204, the software code component of the operating system, the software code component of the virtual file system in the virtual file system layer 206, and/or the software code component of the application in the application layer 208. Each memory 506 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

The processor 204 may be a digital signal processor, ASIC, microprocessor, or other type of processor operating on a computer system, such as a personal computer, server or other computer system, turning such computer system into a specifically programmed machine. The software stored in the memory may be executed on the processor 204. Any function of the logic entity may be performed in one or more modules as desired, and the embodiments described are merely examples in the processor 204.

The processor implements various processing operations of the distributing and computing platform 100. For example, the processor 504 could perform signal coding, data processing, power control, input/output processing, or any other functionality to operate in the distributing and computing platform 100. The processor 204 also supports the methods and teachings described in more detail corresponding to FIGS. 1-6. Each processor 204 includes any suitable processing or computing device configured to perform one or more operations.

Local storage 206 may include, for example, one or more hard disks, flash memory modules, solid state disks, and optical disks. Storage interface 208 enables the logic entities (such as the data node 108, name node 110-1 and the backup name node 110-2) to communicate with one or more network data storage systems that may, for example, store disks that are accessed by nodes. Examples of storage interface 208 are a host bus adapter (HBA) that couples logic entity to a storage area network (SAN).

Figure 3C:
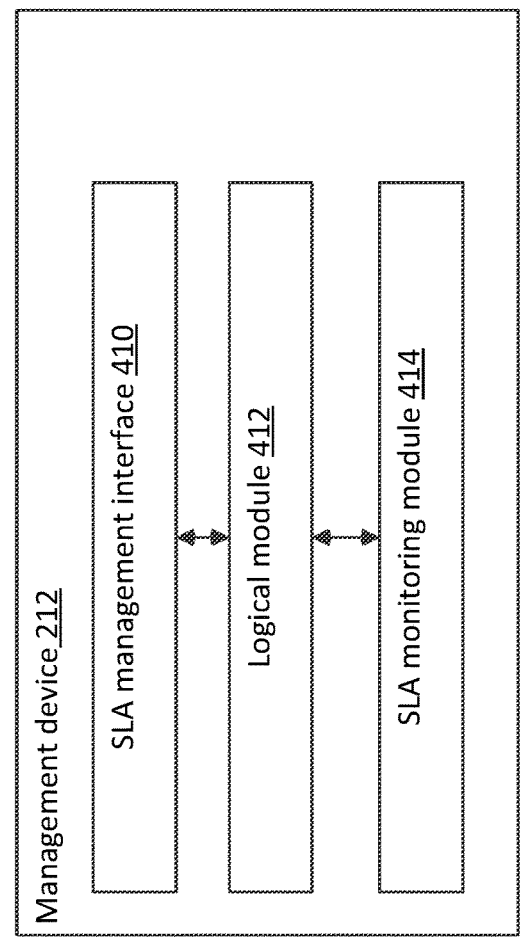
FIG. 3C illustrates an example of a management device of the distributing & computing platform, according to one embodiment of the present disclosure.

FIG. 3C illustrates an example of a management device 212 of the distributing & computing platform 100, according to one embodiment of the present disclosure. The management device 212 includes a service-level agreement (SLA) management interface 410, a logical module 412 and a SLA monitoring module 414. The SLA management interface 410 is connected to the logical module 412, and the logical module 412 is connected to the SAL monitoring module 414.

The management device 212 may communicate to the plurality of data nodes 108 and the user device 120. In one embodiment, the management device 212 is a computer program that resides and executes in distributing & computing platform 100, such as a logical entity in the virtual file system layer 206. In another embodiment, the management device 212 may be separated from the distributing & computing platform 100.

The SLA management interface 410 of the management device 212 is configured to receive from the user device 120 a task request to exist any application of distributing & computing platform 100, record the task request information to the logical module 412. The task request information includes a requirement of the task request, such as a quality of service (QoS), a service-level agreement (SLA).

The SLA monitoring module 414 is configured to communicate with each of data nodes 108, the name node 110-1 and the backup name node 110-2. The SLA monitoring module 414 monitors a processing of each task sent by the user device 120 to the data nodes 108, such as monitors a hardware resource, a network bandwidth resource of the data nodes 108 for each writing, reading, computing task for each data node 108. The SLA monitoring module 414 then sends the monitor data, the task type to the logical module.

The logical module 412 is configured to communicate with the SLA management interface 410 and the SLA monitoring module 414. The SLA monitoring module 414 stores the task request information, and receives and stores the monitoring data which include at least one of a task request ID, a task request type, resource use data, and so on. The task type may be a reading task, a writing task and a computing task, an analyzing task, and so on. The resource data may be information of the network width, the memory, and the CPU and so on. The monitoring data may also include a processing time of a task. The logical module 412 stores the information with the data nodes 108.

The logical module 412 is further configured to determine whether the performing of the task request on the data node meets the requirement of the user device. If the performing of the task request does not meet the requirement of the user, the logical module 412 may balance the task request, transfer the data blocks from a first data node to a second data node based on a type of the recorded tasks on the data blocks stored in the first data node, and based on the type of the file system of the first data node and the second data node respectively.

Figure 4:
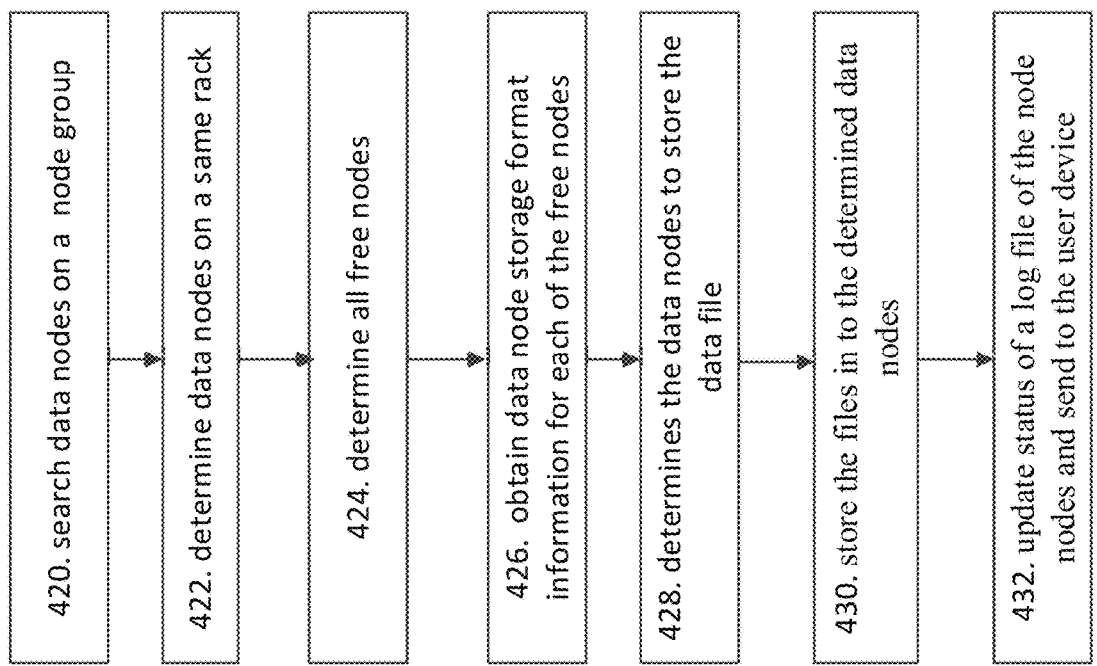
FIG. 4 illustrates an example of a flowchart performed by the distributing & computing platform for writing data into at least one of data node, according to one embodiment of the present disclosure.

FIG. 4 illustrates a flowchart of writing data to the data node according to an example embodiment. The method and function disclosed herein may be implemented by hardware 300 including a processor 204 and memory 202, or by any logical entity of the distributing & computing platform 100 running on the hardware layer 202, such as a name node 110-1, the management device 212 of FIG. 3C. It is understand that the function what described the algorithm is executed by any logical entity, or the apparatus of the distributing & computing platform 100.

Initially, in block 420, the distributing & computing platform 100 may search a data node group to store a data file of an application in the distributing & computing platform 100 after receiving data.

The management device 212, the name node 110-1 or any logical entity or any logical apparatus of the distributing & computing platform 100 may receive a data written request from the user device 120 to store data generated by the application running in the distributing and computing platform 100. Wherein the data written request may include at least one data file need to be written into the data nodes 108 of the distributing & computing platform 100, the data written request may also include the application identifier. In one example, the data written request may also include a processing attribute of the data file or file system type information of the data node which will store the data file. In other example, the data written request may also include user information.

The management device 212 may search a data node group. The data node group of the user comprises a plurality of data nodes assigned to the user, which is used to store the data of the user.

Normally, after the user registers in the distributed & computing platform 100, the distributed & computing platform 100 may assign a plurality of data nodes 108 to the user based on the user's requirement, to store the data files of the user. During storing the data files of the user, the distributed & computing platform 100 may also adjust the number of the plurality of data nodes 108 assigned to the user based on the user requirement, or based on the data file size, or the data file processing attribute. The plurality of data nodes assigned to the user may be located in the same rack, or may be located in different racks.

In block 422, the distributing & computing platform 100 determines a first sub set of data nodes located in a first rack from the data node group of the user.

The management device 212, the name node 110-1 or any logical entity of the distributing & computing platform 100 may obtain data node information of each data node of the data node group from the name node. The data node information includes rack information of each data node. The management device 212, the logical entity or the apparatus determines the first sub set of data nodes located in a first rack in which the management device 212, the logical entity or the apparatus is also located, based on the rack information of each data node in the data node group.

If the distributing & computing platform 100 only includes one rack, block 422 may not be performed. If all the data nodes of the data node group allocate in other rack which is different from the rack in which the management device 212, the name node 110-1 or any logical entity determines a first sub set of data nodes just located in a same rack which may not be same of the management device 212, the name node 110-1 of the distributing and computing device.

In block 424, the distributing & computing platform 100 determines a second sub set of data nodes with enough storage from the first sub set of data nodes. Each of the second sub set of data nodes may be referred to a free data node.

The management device 212 or the name node 110-1 determines the a second sub set of data nodes with enough storage from the first sub set of data nodes, based on the storage information stored in the name node. The second sub set of data nodes is determined from the first sub set of data nodes.

In block 426, the distributing & computing platform 100 may obtain data node storage format information for each of the second sub set of data nodes. The data node storage format information corresponds to the file system formatted to the data node 108.

The name node 110-1 stores the data node storage format information for each of a plurality of data nodes, when the data node 108 is reformatted by other file system, the data node 108 reports the new data node storage format information to the name node. The data node storage format information may identify the file system type, the data node storage format information may include information related to identifying the data node storage format as E4 (EXT4), E3 (EXT3), B (BTRFS) or other arguments for other formats.

After the management device 212, the name node 110-1 or any other logical entity obtains the data node storage format information for each data node of the second sub set data nodes from the name node 110-1, the management device 212, the logical entity or the apparatus may determine the data nodes to store the data based on the data node storage format information of each data node of the data node group and based on the mapping information of the application.

In one example, the name node 110-1 of the distributing & computing platform 100 stores a mapping between the data node storage format type and the data node, as table 1:

TABLE 1

| Data node | Data node Storage format type |
|---|---|
| 106-1 | EXT 3 |
| 106-2 | EXT 4 |
| 106-3 | BTRFS |
| 106-4 | NTFS |
| 106-5 | EXT3 |
| 106-6 | Other format |

In some embodiments, each data node may comprise a plurality of data node storage format. Table 2 illustrates an embodiment of storage format sets with an identifier for each set:

TABLE 2

| Set of Storage Formats Identifier | Storage format type |
|---|---|
| 1 | EXT 3, EXT 4 |
| 2 | EXT3, HPFS |
| 3 | BTRFS, NTFS |
| 4 | NTFS, FAT32 |
| 5 | EXT3, Other Format |

Table 3 illustrates an embodiment of data node storage format sets associated with data nodes:

TABLE 3

| Data node | Set of data node Storage Formats Identifier |
|---|---|
| 106-1 | 1 |
| 106-2 | 2 |
| 106-3 | 3 |
| 106-4 | 4 |
| 106-5 | 5 |
| 106-6 | 1 |

The name node 110-1 may also stores a mapping between each of a plurality of applications and a plurality of application storage formats. When a compiler or an operating system component of the distributing and computing platform 100 compiles or benchmarks an application or when the HDFS implement the algorithm for an application, a data access feature of the application are generated via the compiling or benchmarking, and the data access feature of the application are sent to the name node 110-1. The data access feature of the application may be one or more data access feature. The data access feature of the application may include the weight (percentage) of a specific type of storage access. The name node 110-1 may generate a mapping of the data access feature of the application and the file system format which may identify the storage format information which may be referred to FIG. 8 based on the data access feature of the application. The name node 110-1 generates a mapping between the application and application storage format information. The name node 110-1 stores a learning algorithm, and the name node 110-1 may generate the mapping of the data access feature of the application and the file system format via implementing the learning algorithm.

In addition, the mapping for each application may also include performance features for the file system. The mapping for each application may refer to table 4.

TABLE 4

| Application identifier | File system type |
|---|---|
| App a | EXT 3 |
| App b | EXT 4 |
| App c | BTRFS |
| App d | NTFS |
| App e | EXT3 |
| APP f | other format |

The data node storage format information may be added to the name node 110-1 where the data node information is stored, or the storage format information may also be obtained by the name node 110-1 via periodically collecting the data node storage format information from the data nodes. In another example, when the data node is reformatted by a different file system, the data node storage format information will be reported the new data node storage format information corresponding to the new file system to the name node 110-1.

As an example, when the data node storage format information in the name node 110-1 is updated, the storage format information in the backup node 110-1 will also be updated.

The management device 212, the name node 110-1 or any logical entity may read the data node storage format information for each data node of the data node group from the name node 110-1, and the mapping for the application.

Each data node of the distributing & computing platform 100 stores the data node storage format information, per se. As an example, the data node storage format information may be stored in a version content which is included in the current sub-directory of each node.

In block 428, the distributing & computing platform 100 may determine one or more data nodes which store the data file of the application based on the mapping between the application and the application storage format and based on the data node storage format information for each of a plurality of data nodes in a name node.

The management device 212, the name node 110-1 or any other logical entity determines one or more data node with the data node storage format which matches the application storage format.

The management device 212, the name node 110-1 or any the logical entity may determine the data node storage format of the data nodes which will store the data file, or data generated by applications according to the written request from the user device 120.

In some embodiments, an application will have a plurality of file system types that may be used, but will have a preference as to which is used. The file system type identifies the storage format. This prioritization can be used by the management device to optimize storage based upon the application requirements and preferences. In some embodiments, the application will designate a set of requirements and a preference for those. An example of this embodiment is illustrated by table 5:

TABLE 5

| Application identifier | File system preference type | Requirements | Other Requirements |
| --- | --- | --- | --- |
| App a | EXT 3 | EXT 3, EXT 4 | Min 4 TB Space |
| App b | EXT 4 | EXT 4, FAT 32 | N/A |
| App c | BTRFS | BTRFS, FAT 32 | Min 1 GB Contagious Space |
| App d | NTFS | NTFS | Min Read/Write Speed |
| App e | EXT3 | EXT3 | Max Latency |
| APP f | other format | other format | N/A |

In some embodiments, the name node 110-1, or the management device may optimize the usage of the data nodes by taking the file system preference type for each application, the requirements of the application, and other requirements to optimize the system.

In one example, the storage format of the data node which will store the data file is included in the written request. In other example, the data written request does not include the storage format of the data node, but include a processing attribute of the data file, the management device 212, the logical entity or the apparatus may determine the file system type of the data node based on the processing attribute of the data file. The processing attribute of the data file may be a processing type for the data file, such as reading, written, computing, analyzing and so on. The storage format of the data node may also be named as a data node storage format. The storage format for application may also be named as the application storage format.

After determining the data node storage format information of the data node which will store the data file (the data file may be data of the application, or data generated by the application), the management device 212, the name node 110-1 or any other logical entity may determine a third sub set of data nodes with the determined file system type from the first sub set of data nodes from the second sub set of data nodes.

In block 430, the distributing & computing platform 100 writes or stores the data file into the determined one or more data nodes.

If in block 428, the management device 212, the name node 110-1 or any other logical entity does not determine a data node with storage format which matches the application storage format of the application, the distributing & computing platform 100 writes (stores) the data into the data nodes 108 based on a default strategy of the distributing and computing platform 100.

In block 432, the distributing & computing platform 100 sends the status to a log file and the user.

Before sending the status, the management device 212, the name node 110-1 or any other logical entity update, in the name node 110-1, a status information of the data node which stores the data generated by the application in a log file of the data node after storing the data generated by the application in the data node.

In this embodiment, the distributing & computing platform 100 writes the data file of the application from the user into the determined one or more data nodes with the data node storage format matching the application storage format, which may improve the efficiency of the future processing for the stored data file, reduce the resource usage of the distributing & computing platform 100.

Figure 5:
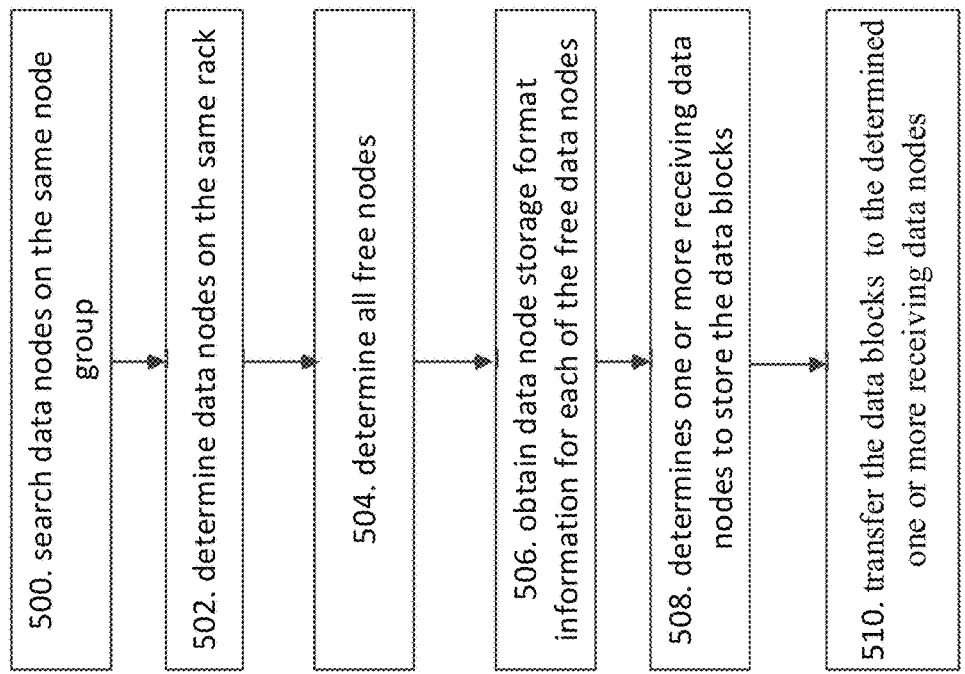
FIG. 5 illustrates an example of a flowchart performed by the distributing & computing platform transferring data from one or more data nodes to other one or more data node, according to one embodiment of the present disclosure.

FIG. 5 illustrates a flowchart of balancing workload between data nodes according to an example embodiment. The method and function disclosed herein may be implemented by hardware 300 including a processor 204 and memory 202, or by any logical entity of the distributing & computing platform 100 running on the hardware layer 202, such as the management device 212 of FIG. 3C, or a balancer of the RDFS. It is understood that the function what described the algorithm is executed by any logical entity, or the apparatus of the distributing & computing platform 100.

Initially, in block 500, the distributing & computing platform 100 may search one or more data nodes in the same data group to store a data file of an application.

The distributing & computing platform 100 determine at least one of a data block to be transferred from one or more sending data nodes to one or more receiving data nodes. The distributing & computing platform 100 searches the one or more data nodes in the same data node group which also includes the one or more sending data nodes.

The one or more sending data nodes may be any data nodes need to transfer the data block to other data nodes based on the balancing. The one or more receiving data nodes may be any data nodes which receive the data block from the one or more sending data nodes based on the balancing.

A balancer of the distributing & computing platform 100 may determine the at least one data block to be transferred from the one or more sending data node to the one or more receiving data nodes based on file balancing or other requirement, such as the QoS requirement, the LSA requirement.

Before performing the block 500, the distributing & computing platform 100 generates a mapping between a workload characteristic of each of the plurality of applications and file system attributes and settings. A balancer of the distributing & computing platform 100 may determine a workload of the one or more sending data nodes need to be balanced based on the workload characteristics of each of the plurality of applications.

After the data files of a user stored in the distributing & computing platform 100, a user device may trigger an application to perform one or more tasks to process data blocks of the data files, such as reading, analyzing, computing and so on. Referring to the description of FIGS. 1A and 1B, the performing different task for the data blocks should use resource of the data node, such as the CPU, the bandwidth, and so on. During monitoring the task performance of the data nodes, the balancer of the distributing & computing platform 100 may determine the at least one data block to be transferred to balance each data node's work. The balancer may be a logic entity in the distributing & computing platform 100, it may be in any data node or in the name node.

After determining that the at least one data block stored in the one or more sending data nodes need to be transferred, the balancer may determine the data nodes of a data node group. The data nodes of the data node group are the plurality of data nodes assigned to the user.

In block 502, the distributing & computing platform 100 determines a first sub set of data nodes located in a first rack from the data node group, with the first rack including the one or more sending data nodes storing the data blocks to be transferred.

The balancer may obtain data node information of each data node of the data node group from the name node 110-1. The data node information includes rack information. The balancer determines the first sub set of data nodes located in a first rack in which the one or more sending data nodes lactated, based on the rack information of each data node in the data node group. Where the one or more sending data nodes store the data block to be transferred.

In block 504, the distributing & computing platform 100 determines a second sub set of data nodes from the first sub set of data nodes. Each of the second sub set of data nodes that is identified has enough storage to store the data to be transferred. Each of the second sub set of data nodes may be referred to a free data node.

The balancer determines a second sub set of data nodes from the first sub set of data node.

In block 506, the distributing & computing platform 100 may obtain data node storage format information for each data node of the second sub set of the data nodes. The data node storage format information includes file system type information. The file system is a system formatted on one or more disks of the data node.

Block 506 may refer to the description of block 406.

In block 508, the distributing & computing platform 100 may determine one or more receiving data nodes to store the at least one data block to be transferred from the at least one free data nodes, with the second data node having a same data node storage format as the first data node.

In block 510, the distributing & computing platform 100 transfer the data blocks into the determined one or more receiving data nodes.

If in block 508, the balancer does not determine a second data node with the same data node storage format the first data node has, the distributing & computing platform 100 writes the data into the data nodes 108 based on a default strategy of the distributing and computing platform 100.

The distributing & computing platform 100 then sends the status to a log file and the user.

Before sending the status, the balancer update, in the name node 110-1, a status information of the data node which stores the data generated by the application to a log file of the data node after storing the data generated by the application in the data node.

In this embodiment, the distributing & computing platform 100, such as a HDFS balancer, performs data balancing process. The distributing & computing platform 100 will first check the data node storage format information of the one or more sending data nodes storing the data block to be transferred. The distributing & computing platform 100 determines one or more receiving data nodes with the data node storage format which the one or more sending data nodes have, and transferred the data from the one or more sending data nodes to the one or more receiving data nodes which have the same data node storage format as of the one or more sending data nodes. This may improve the efficiency of the future processing for data blocks, and reduce the resource usage of the distributing & computing platform 100.

Figure 6:
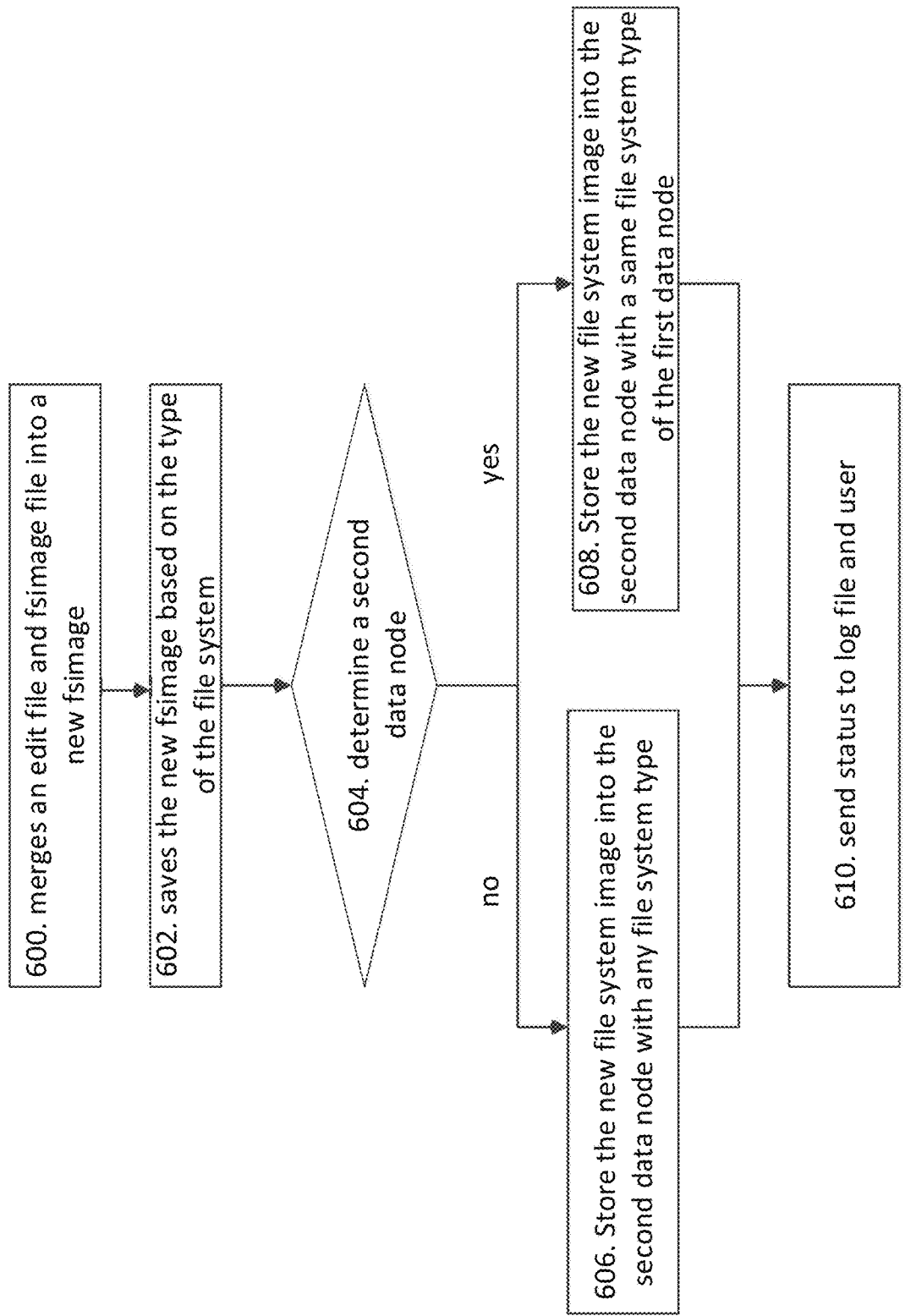
FIG. 6 illustrates a flowchart of storing a new file system image according to an example embodiment.

FIG. 6 illustrates a flowchart of updating a file system image according to an example embodiment. The method and function disclosed herein may be implemented by hardware 300 including a processor 204 and memory 202, or by any logical entity of the distributing & computing platform 100 running on the hardware layer 202, such as the management device 212 of FIG. 3C. It is understand that the function what described the algorithm is executed by any logical entity, or the apparatus of the distributing & computing platform 100.

In block 600, the distributing & computing platform 100 merges an edit file and a file system image, FSimage, file into a new FSimage.

The HDFS runs a checkpoint process to store the latest updates and edits and will back all FSimage files edited up since the previous checkpoint and merges the edit log and the FSimage into a new FSimage. The HDFS may run the checkpoint periodically.

Figure 7:
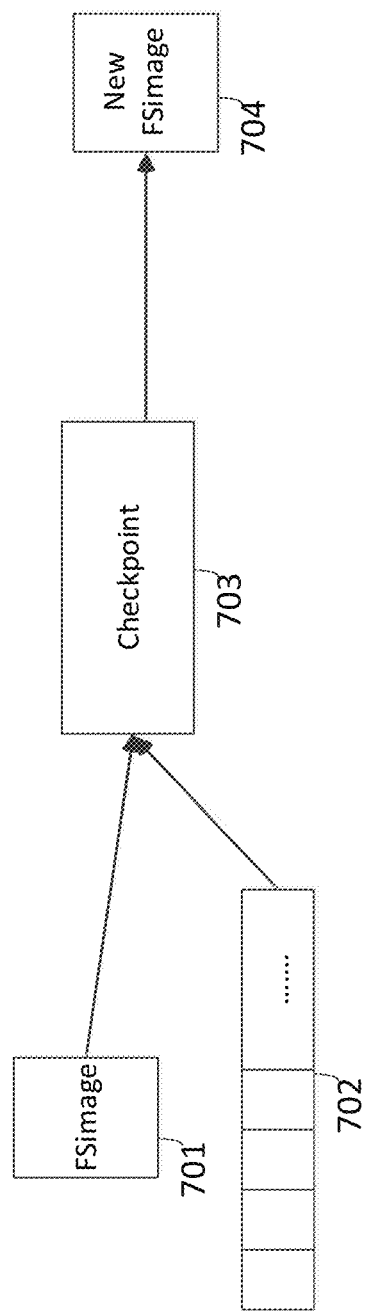
FIG. 7 illustrates a flowchart of updating of a current file system image based on an edit log according to an example embodiment.

The FSimage, referring to the block 701 of FIG. 7, is the FSimage file comprising a complete state of the file system at a point in time. Every file system modification is assigned a unique, monotonically increasing transaction ID. The FSimage file represents the file system state after all modifications up to a specific transaction ID.

The edit log, in block 702, is an edit file which includes a log listing for each file system's change (file creation, deletion or modification) that was made after the previous FSimage.

The storage checkpoint, in block 703, may freeze the file system (known as the primary file-set), initializes the storage checkpoint, and thaws the file system. Specifically, the file system is first brought to a stable state where all of its data is written to disk, and the freezing process momentarily blocks all I/O operations to the file system. The storage checkpoint is created without any actual data; the storage checkpoint instead points to the block map of the primary file set. The thawing process that follows restarts I/O operations to the file system.

In block 602, the distributing & computing platform 100 saves the new FSimage 704 based on the data node storage format of the data node which stores the previous FSimage.

The management device 212, the name node 110-1 or any other logical entity saves the new FSimage files to a data node 108 with the same data node storage format as the previous FSimage stored.

In block 604, the distributing & computing platform 100 determines a data node which has a same data node storage format of which the previous FSimage has.

Before performing block 604, the management device 212, the name node 110-1 or any other logical entity locates all free data nodes to determine all the free data nodes. The management device 212, the name node 110-1 or any other logical entity determines, from the determined free data nodes, a data node which has a same data node storage format which the previous FSimage be stored.

In block 606, the distributing & computing platform 100 stores the new FSimage based on a default strategy.

If in block 604, there is no data node with the same data node storage format as the previous data node which stores the previous FSimage, the management device 212, the name node 110-1 or any other logical entity use a default strategy to store the new FSimage in a data node.

In block 608, the distributing & computing platform 100 stores the new FSimage into the determined node.

In block 610, the distributing & computing platform 100 send the status to a log file and the user.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

FIG. 8 illustrates an example of a mapping between data access patterns of the application and the data node storage format information, according to one embodiment of the present disclosure.

According to FIG. 8, popular file systems being used in the data center 110-1 include the Ext3, the Ext4, the Xfs, the Btrfs (linux OS) and the FAT, the NTFS, the exFAT (windows OS). The file systems have very different features vary in performance for the same program. The Linux FS performances are compared in by using benchmark tests with basic operations including sequential/random read/write for characters and blocks; random seeks and file compressions; semi-synthetic read/write speed and database operations. FIG. 8 shows each file system performed the best at some key fronts of different usage patterns.

Figure 9A:
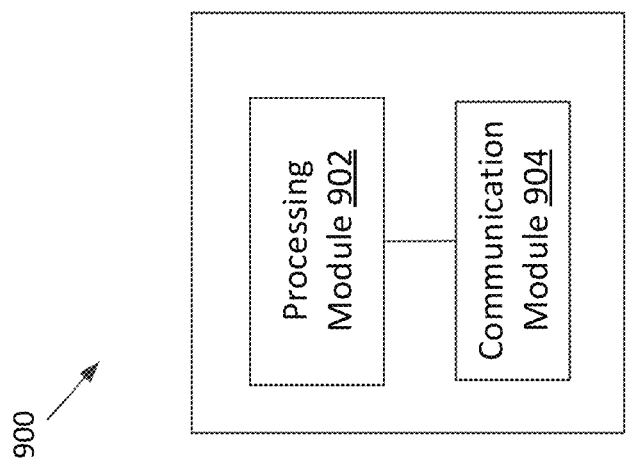
FIGS. 9A and 9B are block diagrams that illustrate embodiments of a name node or of any other device that may be used for implementing the methods according to an embodiment the present disclosure.
Figure 9B:
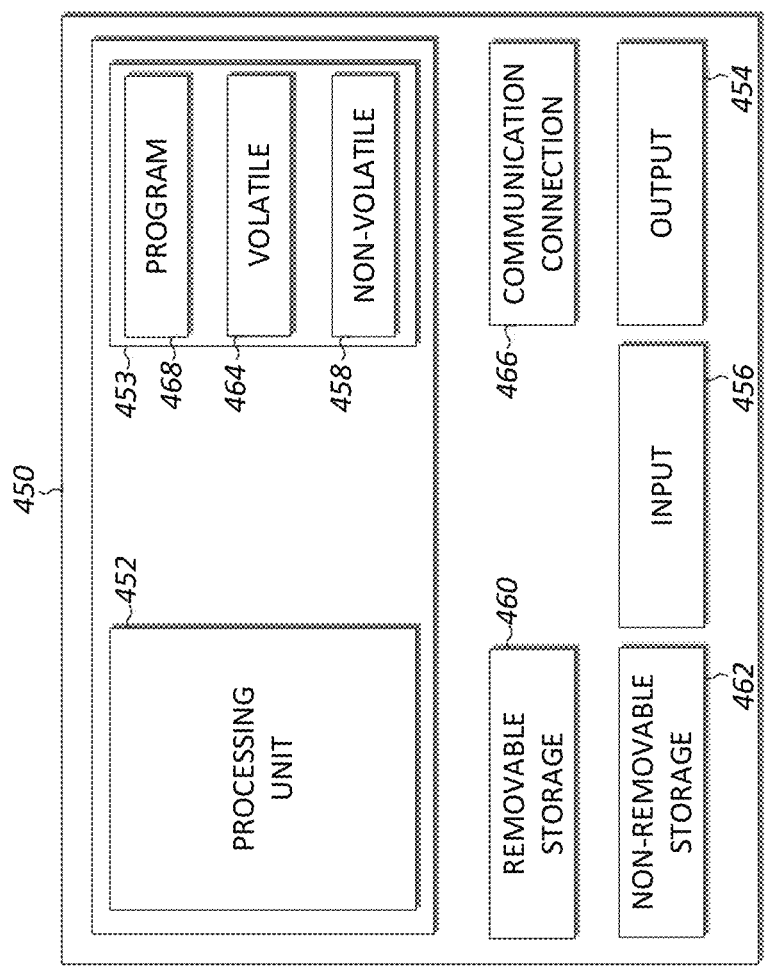

FIGS. 9A and 9B illustrate are block diagrams that illustrate embodiments of a name node 110-1 or of any other device that may be used for implementing the methods according to an embodiment of the invention. The name node 900, which may be a name node 110-1 or a backup name node 110-2, includes a processing module 902, and a communication module 904.

The communication module 904 is connected to the processing module 902, is configured to communicate with the plurality of data nodes 106, the user device 120, the backup name node 110-2. The communication module 904 is further configured to communicate with the processing module 902.

The processing module 902 is connected to the communication module 904, is configured to obtain a mapping between each of a plurality of applications and a plurality of application storage formats, wherein each application has a mapping to at least one application storage format. The processing module 902 further stores the mapping of the application and the application storage format; obtains a data node storage format information for each of a plurality of data nodes; and stores the data node storage format information for each of the plurality of data nodes. The communication module 904 is further to instruct the plurality of applications to store data in at least one data node based on the mapping information.

It is understood that except for the above functions, the communication module 904 and the processing module 902, may also perform the functions of the detection server 30 described in FIGS. 1-8.

Any of the communication module 904 and the processing module 902 maybe embodied in a general-purpose central procession unit (CPU), general process, digital signal processor (DSP), field programmable gate array (FPGA), an application-specific integrated circuit (ASIC), or one or more integrated circuits configured to control the execution of program routines as specified by the present invention. The communication module 904 and the processing module 902 may also be a combination of computing function, such as a combination including one or more microprocessors, combination including DSP and microprocessors and so on. The communication module 902 may be combined in a transceiver which includes any suitable structure for generating signals for wireless transmission and/or processing signals received wirelessly. The communication module 902 may receive and send signals from or to (3G, 4G, 5G), Universal Mobile Telecommunications Service (UMTS), Code Division Multiple Access (CDMA), Global System for Mobiles (GMS) etc. network.

FIG. 9B is a block diagram illustrating circuitry a name node for performing methods defined in this disclosure including those described in relation to FIG. 9A, includes more structural details than FIG. 9A. All components need not be used in various embodiments. One example of a name node or other device may include a processing unit 452, memory 453, removable storage 460, and non-removable storage 462. The processing unit 452 may comprise one or more processors (e.g., control circuitry) that execute instructions stored in memory 453 to realize the embodiments of the disclosure. Although the various data storage elements are illustrated, the storage may also or alternatively include cloud-based storage accessible via a network, such as the Internet or server based storage that is accessible over a wired or wireless channel. Additionally, the removable storage may readily be replaced by non-removable storage.

The memory 453 may include a program 468, volatile memory 464 and non-volatile memory 458. The system 450 may include, or have access to, a computing environment that includes a variety of computer-readable media, such as volatile memory 464 and non-volatile memory 458, removable storage 460 and non-removable storage 462. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

The device 450 may include or have access to a computing environment that includes input 456, output 454, and a communication connection 466. The output 454 may include a display device, such as a touchscreen, that also may serve as an input device. The input 456 may include one or more of a touchscreen, touchpad, mouse, keyboard, camera, one or more device-specific buttons, one or more sensors integrated within or coupled via wired or wireless data connections to the robotic system 400, and other input devices.

The computer may operate in a networked environment using the communication connection 466 to connect to one or more remote computers, such as database servers. The communication connection 416 may include any radios necessary to implement one or more radio access technologies. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 452 of the computer 450. A hard drive, CD-ROM, and RAM are some examples of articles including a non-transitory computer-readable medium such as a storage device. The terms computer-readable medium and storage device do not include carrier waves to the extent carrier waves are deemed too transitory.

Figure 10A:
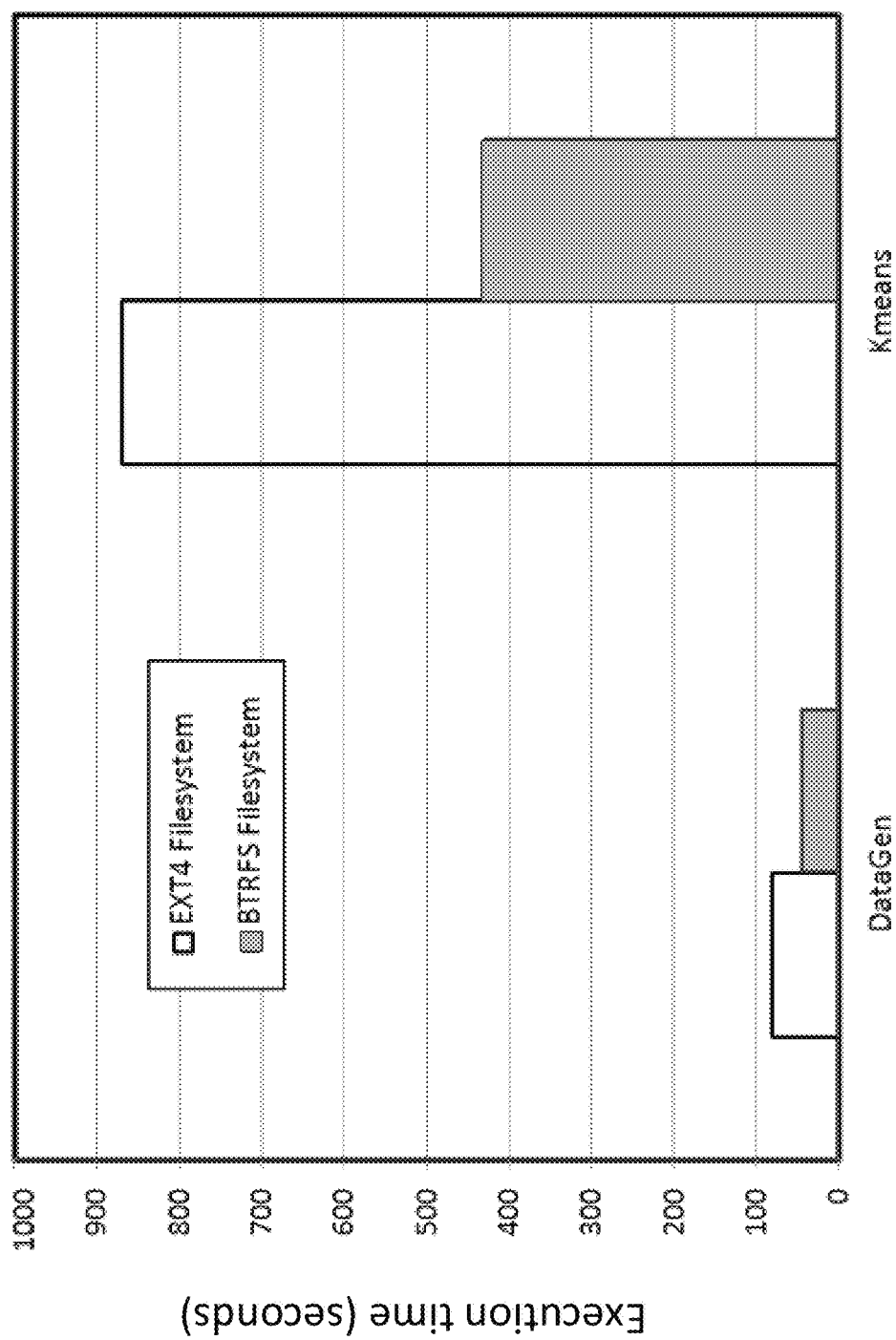
FIG. 10A illustrates an example of a performance comparison result for HI Bench K-meaning clustering benchmark executed on an Ext4 file system and a Btrfs file system according to an embodiment of the invention.

FIG. 10A illustrates an example of a performance comparison result for HiBench K-meaning clustering benchmark executed on an Ext4 file system and a Btrfs file system according to an embodiment of the invention.

The K-means Clustering is a clustering algorithm for knowledge discovery and data mining. Given a set of samples where each one is represented as a d-dimensional vector, the K-means Clustering algorithm finds a centroid and each cluster by running Hadoop job iteratively, until different iterations converge. It has two stages, namely iteration (CPU-bound) and clustering (I/O-bound). In this work, the open source code K-means in HiBench Benchmark kit is used.

The size of the initial data set is 100G in the K-means clustering benchmark. Firstly the program generates initial data set on the disks; secondly the clustering calculations are processed. According to FIG. 10A, at the data generation stage, the Btrfs is 45.2% faster than Ext4 file system; at the clustering stage, Btrfs is 50.6% faster than EXT file system.

Figure 10B:
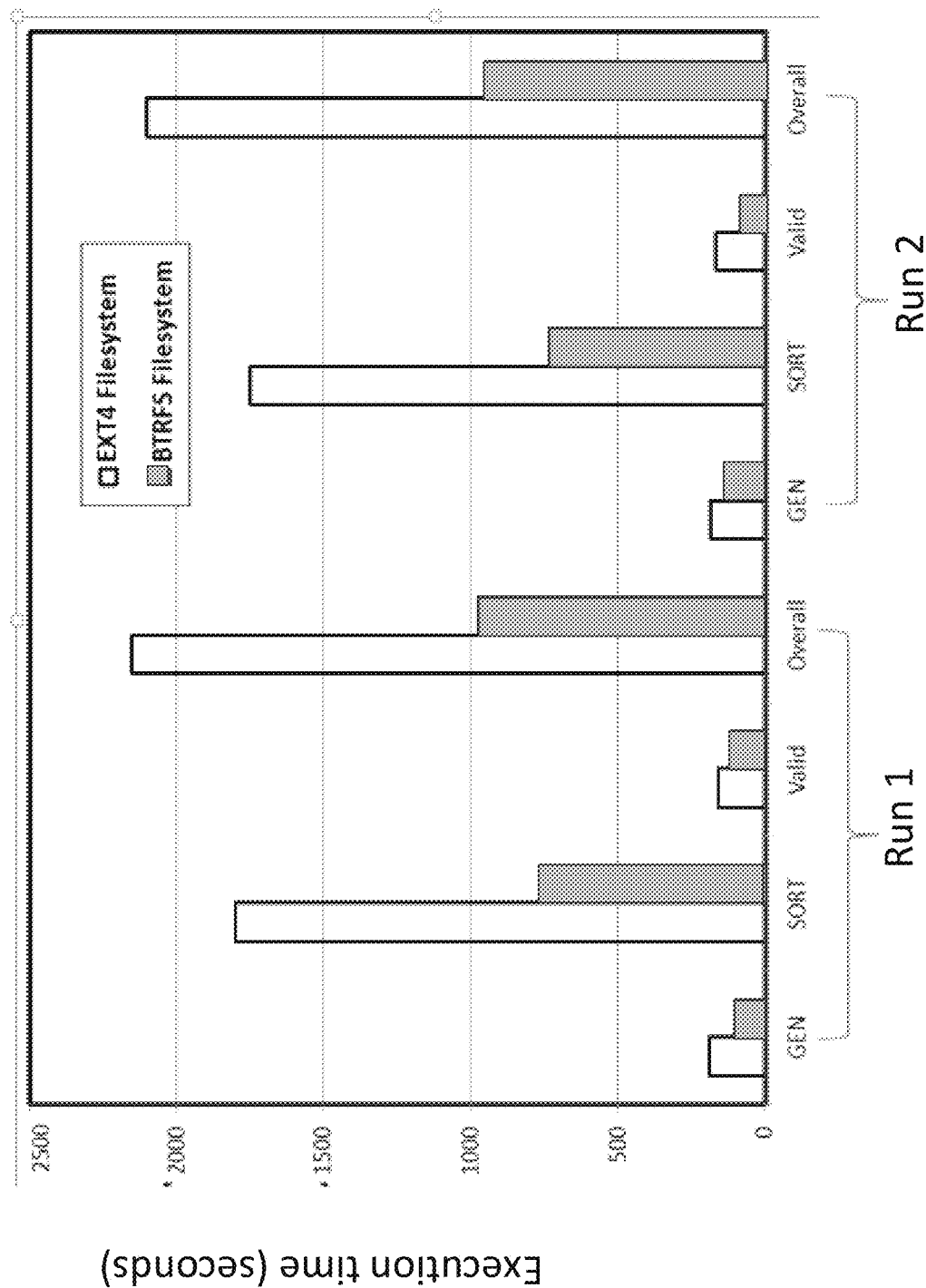
FIG. 10B illustrates an example of a performance comparison result for TPCx-HS benchmark executed on an Ext4 file system and a Btrfs file system according to an embodiment of the invention.

FIG. 10B illustrates an example of a performance comparison result for TPCx-HS benchmark executed on an Ext4 file system and a Btrfs file system according to an embodiment of the invention.

Transaction Processing Performance Council (TPC) Express Benchmark HS (TPCx-HS) is developed using Hadoop sort to provide an objective measure of hardware, operating system and commercial FS distributions. It is recognized by the industry with verifiable performance, price-performance and availability metrics. Hadoop sort is both CPU and I/O intensive.

A full TeraSort benchmark run consists of the three phases: 1) generating the input data via TeraGen; 2) running TeraSort on the input data; data; 3) validating the sorted output data via TeraValidate. The performance comparison of TPCx-HS is shown in FIG. 10. Taking average of performances in Run 1 and Run 2, Btrfs file system has improvements of 37.65% at data generation stage; 57.78% at data sorting stage, and 39.03% at data validation stage. In total, Btrfs performs 54.5% faster on overall execution time comparing with Ext4 file system.

Figure 10C:
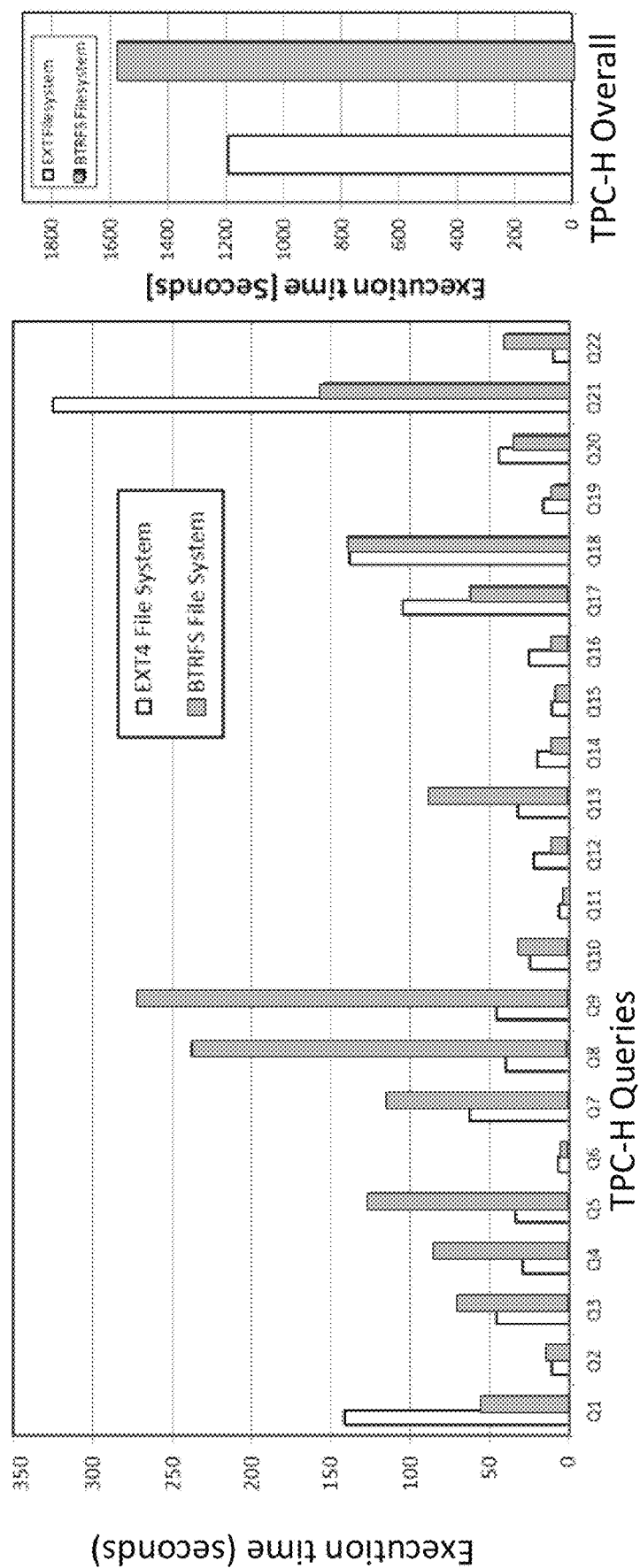
FIG. 10C illustrates an example of a performance comparison result for TPCx-H benchmark power run executed on an Ext4 file system and a Btrfs file system according to an embodiment of the invention.

FIG. 10C illustrates an example of a performance comparison result for TPCx-H benchmark power run executed on an Ext4 file system and a Btrfs file system according to an embodiment of the invention.

TPC-H is developed using database queries for providing an objective measure of high sequential I/O-throughput (large I/O operations). It is critical to excel in large hash-join operations. TPC-H implements both single- and multi-user tests.

TPC-H benchmark give equal importance to the single- and multi-user runs. The performance comparison of TPC-H is shown in FIG. 11. We find in the queries Q1, Q6, Q11, Q12, Q14, Q15, Q16, Q17, Q19, Q20, Q21 Btrfs perform better than Ext4; and in the rest of the queries, Ext4 perform better than Btrfs. The overall performance of Ext4 is 32.6% greater than Btrfs.

Figure 10D:
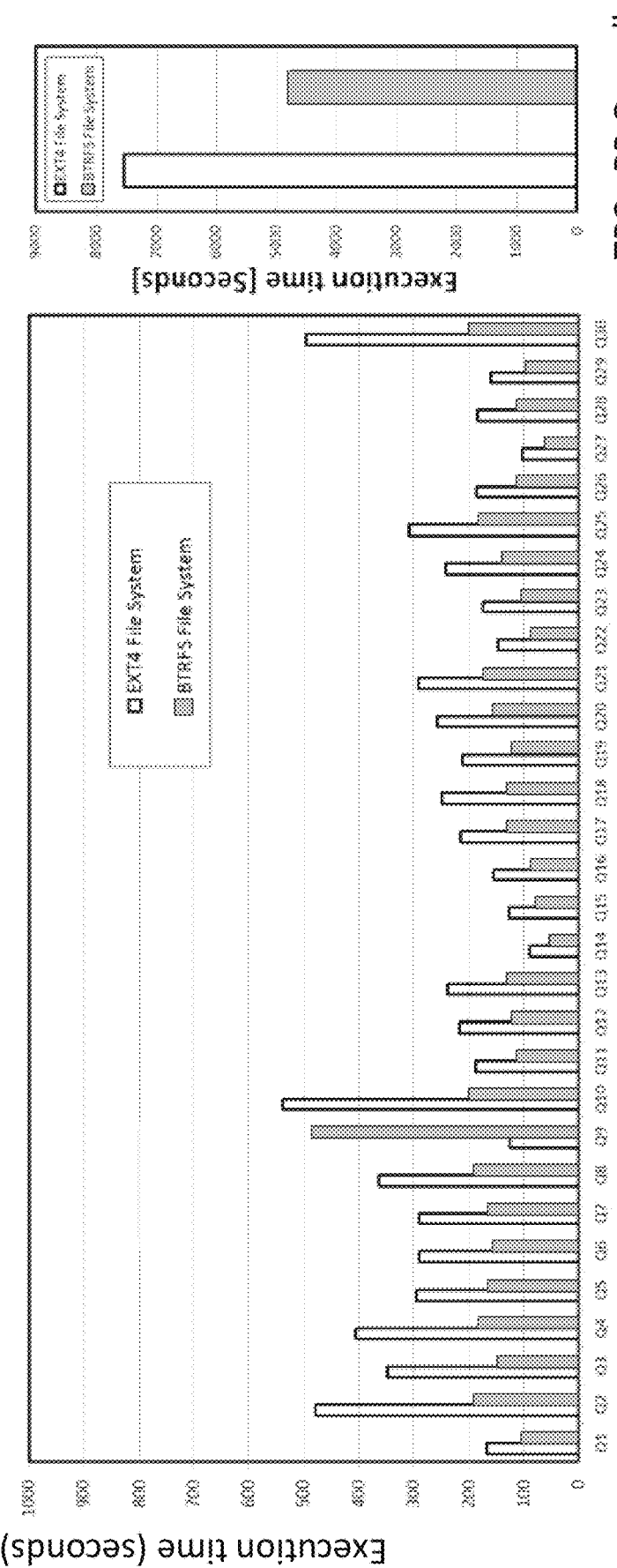
FIG. 10D illustrates an example of a performance comparison result for TPCx-BB benchmark power run executed on an Ext4 file system and a Btrfs file system according to an embodiment of the invention.

FIG. 10D illustrates an example of a performance comparison result for TPCx-BB benchmark power run executed on an Ext4 file system and a Btrfs file system according to an embodiment of the invention.

TPCx-BB uses 30 pre-defined analytics queries to simulate real world conditions in a specific context—namely, that of a retailer with a combined online and brick-and-mortar presence. Queries consist of a mix of SQL statements (expressed in SQL, passed to Hive or Spark) and machine learning (ML) algorithms (using ML libraries, user-defined functions, and procedural code). TPCx-BB measures the performance of Hadoop-based systems. It also specifically refers to Hive or Spark for SQL query processing. The workload is mixed CPU-bound workload and I/O bound workloads.

TPCx-BB benchmark includes 3 phases: 1) Load test: to test how fast raw data can be read from the distributed file system; 2) Power test: to test the system using short-running jobs with less demand on cluster resources, and long-running jobs with high demand on resources; 3) Throughput test: to test the efficiency of cluster resources by simulating a mix of short and long-running job executed in parallel. The performance comparison of TPCx-BB is shown in FIG. 12. In general, the performance of Btrfs file system is better than Ext4 file system at almost all queries except Q9. The overall performance of Btrfs is greater than Ext4 by 46.5% percent.

In the above examples, six Tecal RH2288 V2 Rack servers have been used in this work, each with 2 Intel Xeon Processor E5-2680 (Sandy Bridge-EP) running at 2.7 GHz. Each processor has 8 cores (16 hyperthreaded) and a 20 MB L3 cache. They are connected through two QuickPath links, each providing a unidirectional transmission rate of up to 8.0 GT/s. Each server has 24 8 GB double data rate 3 (DDR3) at 1066 MHz dims of main memory with a total of 192 GB.

2.5" SAS HDDs with 7.2 TB capacity. One SAS disk hosts the OS and the remaining 7 are configured for HDFS. The server provides four onboard gigabit Ethernet (GE) ports, of which two were bonded to double bandwidth. The system runs CDH 5 on centos 6.5. Cloudera is configured as one master node and five worker nodes, Apache Hadoop 2.6 is installed. Each of the nodes has 189.1 GBytes of memory. The same hard drives were firstly formatted in Ext4 format, then Btrfs format, for performance comparison on the same machines. All the other software and hardware environment are identical in both tests.

As the FIGS. 10A-10D disclosed, two file systems have been chosen to compare, i.e. Ext4 and Btrfs. The Btrfs features a number of file system improvements including the compression of intermediate data that mainly improves the MapReduce I/O performance, while consumes some CPU resource which may influence the job's execution time. The I/O pattern of HDFS and MapReduce are different, HDFS's I/O pattern is large sequential access and MapReduce's I/O pattern is small random access. TPCx-HS, TPCx-BB and K-means Clustering benchmark are all I/O intensive and CPU intensive, they can work better with Btrfs. Workload like TPCx-H is I/O intensive, it can work better with Ext4 system.

Additional aspects of the embodiments of the are illustrated the following examples:

Example 1. A method performed by a distributing and computing platform comprising a plurality of data nodes and a name node, comprising:

generating a mapping between each of a plurality of applications and a plurality of application storage formats, wherein each application has a mapping to at least one application storage format;

storing the mapping of the application and the application storage format in the name node;

obtaining, by the name node, a data node storage format information for each of the plurality of data nodes;

storing the data node storage format information for each of the plurality of data nodes in the name node; and storing data generated by at least one of the plurality of applications in at least one data node based on the mapping information stored in the name node.

Example 2. The method according to example 1, wherein the storage format information comprises information related to identifying the data node storage format as a third extended file system (EXT3), a fourth extended file system (EXT4), or a Btree file system (BTRFS).

Example 3. The method according to claim example 1 or 2, further comprising:

reporting, by a data node of the distributing & computing platform, new data node storage format information to the name node when the data node is reformatted.

Example 4. The method according to any one of examples 1-3, before storing data generated by the application in the data node, the method further comprising:

searching at least one data nodes with the data node storage format matching the application storage format.

Example 5. The method according to example 4, before storing data generated by the application to the data node, the method further comprising:

storing data generated by the application in the at least one data node based on a default system strategy if there is no data nodes with the storage format matching the data generated by the application.

Example 6. The method according to any one of examples 1-5, further comprising:

updating in the name node, a status information of the data node which stores the data generated by the application in a log file of the data node after storing the data generated by the application in the data node.

Example 7. The method according to any one of examples 1-6, the method further comprising:

generating a mapping between workload characteristic of each of the plurality of applications and a set of file system attributes and settings.

Example 8. The method according to example 7, the method further comprising:

balancing a workload of the plurality of data nodes based on the workload characteristics of each of the plurality of applications.

Example 9. The method according to example 8, wherein the balancing the workload of the plurality of data nodes comprises:

transferring the data from one or more sending data nodes to one or more receiving data nodes, with the one or more receiving data nodes have a same storage format as the one or more sending data nodes based on the data node storage format of each of the plurality of data nodes in the name node.

Example 10. The method according to example 9, before transferring the data, the method further comprises:

determining at least one free data nodes which is available to storing the data transferred from the one or more sending data node;

determining the one or more sending data nodes from the at least one free data nodes, with the one or more sending data nodes having a same storage format as the one or more sending data nodes.

Example 11. The method according to any one of examples 8-11, further comprising:

transferring the data from one or more sending data nodes to one or more receiving data nodes based on a default transferring data system strategy if there is no the second data node which has a same storage format as a first data node.

Example 12. The method according to any one of examples 1-11, further comprising:

running a checkpoint process to updating a FSimage;

storing the updated FSimage into a second data node with a same storage format as a first data node which stores a previous FSimage before updating.

Example 13. The method according to example 12, further comprising:

storing the updated FSimage into a second data node based on a default storing FSimage system strategy if there is no the second data node which has a same storage format as the first data node.

Example 14. The method according to any one of examples 1-13, further comprising:

compiling or benchmarking the application to generate a data access feature of the application; and sending the data access feature of the application to the name node.

Example 15. The method according to example 14, further comprising:

generating a mapping between the application and the file system format identifying the storage format based on the data access feature of the application;

storing the mapping between the application and the file system format identifying the storage format to the name node.

Example 16. An apparatus, comprising:

a non-transitory memory comprising instructions; and one or more processors in communications with the memory, wherein the one or more processors are configured to execute the instructions to:

obtain a mapping between each of a plurality of applications and a plurality of application storage formats, wherein each application has a mapping to at least one application storage format;

store the mapping of the application and the application storage format;

obtain a data node storage format information for each of a plurality of data nodes;

store the data node storage format information for each of the plurality of data nodes; and instruct the plurality of applications to store data in at least one data node based on the mapping information.

Example 17. The name node according to Example 16, wherein the storage format information of each of the plurality of data node is reported on a regular interval.

Example 18. The name node according to Example 16 or 17, the one or more processors are configured to further execute the instructions to:

search at least one data nodes of the plurality of data nodes with the data node storage format matching the application storage format before storing data generated by the application in the data node.

Example 19. The name node according to Example 18, the one or more processors are configured to further execute the instructions to: store data based on a default system strategy.

What is claimed is:

1. A method performed by a name node, comprising:
    generating, by the name node, a mapping between each of a plurality of applications and a plurality of application storage formats, wherein each application has a mapping to at least one application storage format;
    storing, in the name node, the mapping of each of the plurality of applications and the plurality of application storage formats;
    obtaining, by the name node, a data node storage format information for each of a plurality of data nodes;
    storing the data node storage format information for each of the plurality of data nodes in the name node;
    storing data generated by at least one of the plurality of applications in at least one data node of the plurality of data nodes based on the mapping stored in the name node; and
    balancing a workload of the plurality of data nodes based on workload characteristics of each of the plurality of applications.

2. The method according to claim 1, wherein the storage format information comprises information related to identifying the data node storage format as a third extended file system (EXT3), a fourth extended file system (EXT4), or a Btree file system (BTRFS).

3. The method according to claim 1, further comprising:
    receiving, by the name node, a report from at least one of the data nodes, the report including new data node storage format information, when the at least one data node is reformatted.

4. The method according to claim 1, before storing data generated by at least one of the plurality of applications in at least one of the plurality of data nodes, the method further comprising:
    searching the at least one of the plurality of data nodes with the data node storage format matching the application storage format.

5. The method according to claim 4, before storing data generated by at least one of the plurality of applications in at least one of the plurality of data nodes, the method further comprising:
    storing data generated by the at least one of the plurality of applications in the at least one data node based on a default system strategy when no data nodes with the storage format match the data generated by the at least one of the plurality of applications.

6. The method according to claim 1, further comprising:
    updating, in the name node, a status information of at least one of the plurality of data nodes, which stores the data generated by at least one of the plurality of applications in a log file of the data node after storing the data generated by the at least one of the plurality of applications in the data node.

7. The method according to claim 1, the method further comprising:
    generating a mapping between the workload characteristics of each of the plurality of applications and a set of file system attributes and settings.

8. The method according to claim 7, wherein the balancing the workload of the plurality of data nodes comprises:
    transferring the data from one or more sending data nodes to one or more receiving data nodes, with the one or more receiving data nodes have a same storage format as the one or more sending data nodes based on the data node storage format of each of the plurality of data nodes in the name node.

9. The method according to claim 8, before transferring the data, the method further comprises:
    determining at least one free data node which is available to store the data transferred from the one or more sending data nodes; and
    determining the one or more sending data nodes from the at least one free data node, with the one or more sending data nodes from the at least one free data node having a same storage format as the one or more sending data nodes.

10. The method according to claim 1, further comprising:
    transferring the data from one or more sending data nodes to one or more receiving data nodes based on a default transferring data system strategy when no second data node has a same storage format as a first data node.

11. The method according to claim 1, further comprising:
    running a checkpoint process to update a FSimage; and
    storing the updated FSimage into a second data node with a same storage format as a first data node which stores a previous FSimage before updating.

12. The method according to claim 11, further comprising:
    storing the updated FSimage into the second data node based on a default storing FSimage system strategy when no second data node which has a same storage format as the first data node.

13. The method according to claim 1, further comprising:
    compiling or benchmarking the at least one of the plurality of applications to generate a data access feature of the at least one of the plurality of applications; and
    sending the data access feature of the at least one of the plurality of applications to the name node.

14. The method according to claim 13, further comprising:
    generating a mapping between the at least one of the plurality of applications and a file system format identifying the storage format based on the data access feature of the at least one of the plurality of applications;
    storing the mapping between the at least one of the plurality of applications and the file system format identifying the storage format to the name node.

15. A name node, comprising:
    a non-transitory memory comprising instructions; and
    one or more processors in communications with the memory, wherein the one or more processors are configured to execute the instructions to:
    obtain a mapping between each of a plurality of applications and a plurality of application storage formats, wherein each application has a mapping to at least one application storage format;
    store the mapping of each of the plurality of applications and the plurality of application storage formats;
    obtain a data node storage format information for each of a plurality of data nodes;
    store the data node storage format information for each of the plurality of data nodes;
    instruct the plurality of applications to store data in at least one data node of the plurality of data nodes based on the mapping; and balance a workload of the plurality of data nodes based on workload characteristics of each of the plurality of applications.

16. The name node according to claim 15, wherein the storage format information of each of the plurality of data nodes is reported on a regular interval.

17. The name node according to claim 15, wherein the one or more processors are configured to further execute the instructions to:

search at least one data node of the plurality of date nodes with the data node storage format matching the application storage format before the instructing.

18. The name node according to claim 17, wherein the one or more processors are configured to further execute the instructions to:

store data based on a default system strategy.

19. The name node according to claim 15, wherein the one or more processors are configured to further execute the instructions to:

generate a mapping between the workload characteristics of each of the plurality of applications and a set of file system attributes and settings.

\* \* \* \* \*

UNITED STATES PATENT AND TRADEMARK OFFICE
CERTIFICATE OF CORRECTION

PATENT NO. : 11,106,629 B2  
APPLICATION NO. : 16/023654  
DATED : August 31, 2021  
INVENTOR(S) : Ren Page 1 of 1

It is certified that error appears in the above-identified patent and that said Letters Patent is hereby corrected as shown below:

In the Claims

Column 24, Line 3 please replace "have a" with --having a--

Column 25, Line 10 please replace "of date" with --of data--

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*